United States Patent
Schoessler et al.

(10) Patent No.: US 10,890,982 B2
(45) Date of Patent: Jan. 12, 2021

(54) SYSTEM AND METHOD FOR MULTIPURPOSE INPUT DEVICE FOR TWO-DIMENSIONAL AND THREE-DIMENSIONAL ENVIRONMENTS

(71) Applicant: Samsung Electronics Co., Ltd., Gyeonggi-do (KR)

(72) Inventors: Philipp Schoessler, Los Gatos, CA (US); Link Huang, San Jose, CA (US); Dane Mason, San Francisco, CA (US); Sergio Perdices-Gonzalez, Sunnyvale, CA (US); Jun Yeon Cho, San Jose, CA (US); Nigel Clarke, Mountain View, CA (US); Jose Marcel Santos, Sunnyvale, CA (US); Brian Harms, San Jose, CA (US); Jiawei Zhang, Sunnyvale, CA (US); Curtis Aumiller, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/386,149

(22) Filed: Apr. 16, 2019

(65) Prior Publication Data
US 2020/0192486 A1 Jun. 18, 2020

Related U.S. Application Data

(60) Provisional application No. 62/781,205, filed on Dec. 18, 2018.

(51) Int. Cl.
*G06F 3/01* (2006.01)
*G06F 3/0346* (2013.01)
(Continued)

(52) U.S. Cl.
CPC ............ *G06F 3/017* (2013.01); *G06F 3/0346* (2013.01); *G06F 3/03543* (2013.01); *G06F 3/041* (2013.01)

(58) Field of Classification Search
CPC ...... G06F 3/017; G06F 3/03543; G06F 3/041; G06F 3/0346
See application file for complete search history.

(56) References Cited

U.S. PATENT DOCUMENTS 5,703,623 A 12/1997 Hall et al.
5,745,591 A * 4/1998 Feldman ................. G06F 21/32
382/115

(Continued)

FOREIGN PATENT DOCUMENTS

JP       2015141686 A   8/2015
KR  10-2004-0086721 A  10/2004
(Continued)

OTHER PUBLICATIONS

International Search Report dated Feb. 21, 2020 in connection with International Patent Application No. PCT/KR2019/015336, 3 pages.

*Primary Examiner* — Amy Onyekaba

(57) ABSTRACT

A system and method for a hybrid multimode input device includes a multimode input device capable of a two-dimensional (2D) mode of operation and a three-dimensional (3D) mode of operation. The device includes a two-dimensional (2D) position sensor, a three-dimensional (3D) position sensor, and a processor. The processor is configured to enter a 3D input mode when the processor detects that the input device is in a first orientation, and enter a 2D input mode when the processor detects that the input device is in a second orientation. The 2D input mode is configured to provide 2D position data to a connected computer system,
(Continued)

and wherein the 3D input mode is configured to provide 3D position data to the connected computer system.

20 Claims, 15 Drawing Sheets

(51) Int. Cl.
*G06F 3/041* (2006.01)
*G06F 3/0354* (2013.01)

(56) References Cited

U.S. PATENT DOCUMENTS

| | | | | |
|---|---|---|---|---|
| 6,163,616 A * | 12/2000 | Feldman | G06F 21/316 | 382/115 |
| 6,342,878 B1 * | 1/2002 | Chevassus | G06F 3/0346 | 345/157 |
| 6,515,651 B1 * | 2/2003 | Berstis | G06F 3/0338 | 345/157 |
| 7,532,901 B1 * | 5/2009 | LaFranchise | H04M 1/6066 | 178/19.04 |
| 8,009,138 B2 | 8/2011 | Yasutake | | |
| 8,405,608 B2 * | 3/2013 | Al-Ali | A61B 5/0002 | 345/158 |
| 9,635,162 B2 * | 4/2017 | Raynor | G06F 3/03547 | |
| 9,678,583 B2 * | 6/2017 | Cheng | G06F 3/0325 | |
| 10,048,759 B2 | 8/2018 | Richter | | |
| 2002/0167482 A1 * | 11/2002 | Yin | G06F 3/03543 | 345/156 |
| 2003/0007104 A1 * | 1/2003 | Hoshino | G08C 23/04 | 348/734 |
| 2004/0032392 A1 * | 2/2004 | Chi | G06F 3/03546 | 345/156 |
| 2004/0259590 A1 * | 12/2004 | Middleton | H04M 1/0235 | 455/556.1 |
| 2005/0001786 A1 * | 1/2005 | Jensen | G06F 3/0338 | 345/6 |
| 2005/0078087 A1 * | 4/2005 | Gates | G06F 3/03543 | 345/163 |
| 2006/0092133 A1 | 5/2006 | Touma et al. | | |
| 2007/0279381 A1 * | 12/2007 | Odell | G06F 3/03543 | 345/163 |
| 2008/0096651 A1 * | 4/2008 | Okada | G06F 3/0425 | 463/31 |
| 2008/0134784 A1 * | 6/2008 | Jeng | G06F 3/0346 | 73/514.01 |
| 2009/0040175 A1 | 2/2009 | Xu et al. | | |
| 2009/0153485 A1 * | 6/2009 | Bohn | G06F 3/042 | 345/166 |
| 2009/0225031 A1 * | 9/2009 | Kim | G06F 3/03545 | 345/166 |
| 2009/0231275 A1 * | 9/2009 | Odgers | G06F 1/1692 | 345/157 |
| 2010/0127983 A1 * | 5/2010 | Irani | G06F 3/03543 | 345/163 |
| 2011/0006108 A1 * | 1/2011 | Yoshida | G08C 19/36 | 235/375 |
| 2011/0011925 A1 * | 1/2011 | Yoshida | H04N 5/4403 | 235/375 |
| 2011/0018803 A1 * | 1/2011 | Underkoffler | G06F 3/0325 | 345/158 |
| 2011/0025598 A1 * | 2/2011 | Underkoffler | G06F 3/0325 | 345/156 |
| 2011/0025603 A1 * | 2/2011 | Underkoffler | G06F 3/0325 | 345/158 |
| 2011/0163958 A1 * | 7/2011 | Yen | G06F 3/03543 | 345/163 |
| 2011/0195781 A1 * | 8/2011 | Chen | A63F 13/214 | 463/37 |
| 2012/0068930 A1 * | 3/2012 | Mizutani | G06F 3/03543 | 345/163 |
| 2012/0146901 A1 * | 6/2012 | Ujiie | G06F 3/038 | 345/157 |
| 2012/0256821 A1 * | 10/2012 | Olsson | G06F 3/0346 | 345/156 |
| 2013/0314320 A1 | 11/2013 | Hwang et al. | | |
| 2014/0015750 A1 * | 1/2014 | Chen | G06F 3/0383 | 345/163 |
| 2014/0129937 A1 * | 5/2014 | Jarvinen | G06F 3/04847 | 715/716 |
| 2014/0285525 A1 * | 9/2014 | Okusu | G09G 5/38 | 345/659 |
| 2014/0306893 A1 * | 10/2014 | Siddiqui | G06F 3/0338 | 345/163 |
| 2014/0362025 A1 * | 12/2014 | Sesto | H02J 7/025 | 345/174 |
| 2015/0049021 A1 * | 2/2015 | Cheng | G06F 3/0325 | 345/163 |
| 2015/0054746 A1 * | 2/2015 | O'Conaire | G06F 3/03543 | 345/163 |
| 2015/0193023 A1 * | 7/2015 | Odgers | G06F 3/017 | 345/163 |
| 2015/0324570 A1 * | 11/2015 | Lee | G06K 9/00087 | 382/124 |
| 2016/0027214 A1 | 1/2016 | Memmott et al. | | |
| 2016/0030835 A1 * | 2/2016 | Argiro | A63F 13/02 | 463/33 |
| 2016/0274622 A1 * | 9/2016 | Braun | G06F 1/1626 | |
| 2017/0102775 A1 * | 4/2017 | Keller | G06F 3/017 | |
| 2018/0081456 A1 * | 3/2018 | Li | G06F 3/03545 | |
| 2018/0088684 A1 * | 3/2018 | Dillon | G06F 3/0383 | |
| 2018/0150150 A1 | 5/2018 | Park et al. | | |
| 2018/0205939 A1 * | 7/2018 | Hosenpud | H04N 13/366 | |
| 2018/0210565 A1 * | 7/2018 | Chang | G06F 3/03544 | |
| 2018/0239428 A1 * | 8/2018 | Maheriya | G06F 3/014 | |
| 2018/0253156 A1 * | 9/2018 | Tseng | G06F 3/0383 | |
| 2018/0267609 A1 * | 9/2018 | Strese | G06F 3/03543 | |
| 2018/0307301 A1 * | 10/2018 | Lee | G06F 3/011 | |
| 2018/0356904 A1 * | 12/2018 | Disano | G06F 1/1677 | |
| 2019/0116448 A1 * | 4/2019 | Schmidt | G06F 3/167 | |
| 2019/0139426 A1 * | 5/2019 | Kesavadas | G09B 19/00 | |
| 2019/0171302 A1 * | 6/2019 | Su | G06F 1/3215 | |
| 2019/0192041 A1 * | 6/2019 | Malc K | A61B 5/6897 | |
| 2019/0220107 A1 * | 7/2019 | Odgers | G06F 3/03543 | |
| 2020/0050292 A1 * | 2/2020 | O'Conaire | G06F 3/03543 | |

FOREIGN PATENT DOCUMENTS

| | | |
|---|---|---|
| KR | 10-2009-0030697 A | 3/2009 |
| KR | 10-2014-0105961 A | 9/2014 |
| KR | 10-1568011 B1 | 11/2015 |

* cited by examiner

SYSTEM AND METHOD FOR MULTIPURPOSE INPUT DEVICE FOR TWO-DIMENSIONAL AND THREE-DIMENSIONAL ENVIRONMENTS

CROSS-REFERENCE TO RELATED APPLICATION(S) AND CLAIM OF PRIORITY

This application claims priority under 35 U.S.C. § 119(e) to U.S. Provisional Patent Application No. 62/781,205 filed on Dec. 18, 2018 and entitled "MULTIPURPOSE INPUT DEVICE FOR TRADITIONAL AND MIXED REALITY ENVIRONMENTS". The above-identified provisional patent application is hereby incorporated by reference in its entirety.

TECHNICAL FIELD

This disclosure relates generally to computer systems. More specifically, this disclosure relates to an input device for two-dimensional and three-dimensional environments.

BACKGROUND

Mixed reality systems are a growing market. The tracking of inputs for traditional environments are often accomplished with a mouse device. The "Windows, Icon, Mouse, and Pointer" paradigm of desktop computing has remained largely unchanged since the late 1970s. The advent of mobile computing, such as smartphones, tablets, and the like, has led to innovations in input and user experience such as multi-touch, styluses, and so forth. Similarly, today's Virtual and Augmented Reality (VR/AR) computing interfaces require specific remotes and controllers for user input, which are distinct from traditional computing mice.

SUMMARY

This disclosure provides a system and method for a multipurpose input device for two-dimensional (2D) and three-dimensional (3D) environments.

In a first embodiment, an input device is provided. The device includes a position sensor capable of sensing two-dimensional (2D) position and a three-dimensional (3D) position, and a processor. The processor is configured to enter a 3D input mode when the processor detects (e.g., via information from the position sensor) that the input device is in a first orientation, and enter a 2D input mode when the processor detects (e.g., via information from the position sensor) that the input device is in a second orientation. The 2D input mode is configured to provide 2D position data to a connected computer system, and wherein the 3D input mode is configured to provide 3D position data to the connected computer system.

In a second embodiment, a method is provided. The method includes entering a 3D input mode when an input device is in a first orientation. The method also includes entering a 2D input mode when the input device is in a second orientation. The 2D input mode is configured to provide 2D position data to a connected computer system, and wherein the 3D input mode is configured to provide 3D position data to the connected computer system.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used herein, the terms "have," "may have," "include," "may include," "can have," or "can include" a feature (e.g., a number, function, operation, or a component such as a part) indicate the existence of the feature and do not exclude the existence of other features.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and do not limit the components. These terms are only used to distinguish one component from another. For example, a first user device and a second user device may indicate different user devices from each other regardless of the order or importance of the devices. For example, a first component may be denoted a second component, and vice versa without departing from the scope of the present disclosure.

It will be understood that when an element (e.g., a first element) is referred to as being (operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

As used herein, the terms "configured (or set) to" may be interchangeably used with the terms "suitable for," "having the capacity to," "designed to," "adapted to," "made to," or "capable of" depending on circumstances. The term "configured (or set) to" does not essentially mean "specifically designed in hardware to." Rather, the term "configured to" may mean that a device can perform an operation together with another device or parts.

For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

The terms as used herein are provided merely to describe some embodiments thereof, but not to limit the scope of other embodiments of the present disclosure. It is to be understood that the singular forms "a," "an," and "the" include plural references unless the context clearly dictates otherwise. All terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the present disclosure.

For example, examples of the electronic device according to embodiments of the present disclosure may include at least one of a smartphone, a tablet personal computer (PC), a mobile phone, a video phone, an e-book reader, a desktop PC, a laptop computer, a netbook computer, a workstation, a PDA (personal digital assistant), a portable multimedia player (PMP), an MP3 player, a mobile medical device, a camera, or a wearable device (e.g., smart glasses, a head-mounted device (HMD), electronic clothes, an electronic bracelet, an electronic necklace, an electronic accessory, an electronic tattoo, a smart mirror, or a smart watch).

Definitions for other certain words and phrases are provided throughout this patent document. Those of ordinary skill in the art should understand that in many if not most instances, such definitions apply to prior as well as future uses of such defined words and phrases.

According to embodiments of the present disclosure, the electronic device can be a smart home appliance. Examples of the smart home appliance can include at least one of a television, a digital video disk (DVD) player, an audio player, a refrigerator, an air conditioner, a vacuum cleaner, an oven, a microwave oven, a washer, a dryer, an air purifier, a set-top box, a home automation control panel, a security control panel, a TV box (e.g., Samsung HomeSync™, APPLE TV™, or GOOGLE TV™), a gaming console (XBOX™, PLAYSTATION™), an electronic dictionary, an electronic key, a camcorder, or an electronic picture frame.

According to certain embodiments of the present disclosure, examples of the electronic device can include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, automatic teller's machines (ATMs), point of sales (POS) devices, or Internet of Things devices (e.g., a bulb, various sensors, an electric or gas meter, a sprinkler, a fire alarm, a thermostat, a street light, a toaster, fitness equipment, a hot water tank, a heater, or a boiler).

According to certain embodiments of the disclosure, the electronic device can be at least one of a part of a piece of furniture or building/structure, an electronic board, an electronic signature receiving device, a projector, or various measurement devices (e.g., devices for measuring water, electricity, gas, or electromagnetic waves).

According to embodiments of the present disclosure, the electronic device is one or a combination of the above-listed devices. According to embodiments of the present disclosure, the electronic device is a flexible electronic device. The electronic device disclosed herein is not limited to the above-listed devices, and can include new electronic devices depending on the development of technology.

As used herein, the term "user" may denote a human or another device (e.g., an artificial intelligent electronic device) using the electronic device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 17, discussed below, and the various embodiments used to describe the principles of this disclosure in this patent document are by way of illustration only and should not be construed in any way to limit the scope of the disclosure. Those skilled in the art will understand that the principles of this disclosure can be implemented in any suitably arranged wireless communication system.

The traditional "Windows, Icon, Mouse, and Pointer" (WIMP) paradigm is configured to provide two-dimensional (2D) inputs for an electronic device. The advent of mobile computing has led to innovations in input and user experience such as multi-touch, styluses, and the like. Similarly, today's Virtual Reality (VR), Augmented Reality (AR), Mixed Reality (MR), Cross/Extended Reality (XR) and/or other computing interfaces require specific remotes and/or controllers for user input that are distinct from traditional computing mice. The existing VR/AR/MR/XR input approaches allow for three-dimensional (3D) manipulation of UI elements, but cannot emulate the precision input of a traditional computing mouse.

Embodiments of the present disclosure provide for a hybrid, multi-mode device that is able to function as both a computing mouse in a 2D environment as well as a VR/AR/MR/XR controller for a 3D environment. The disclosed technology's hybrid system allows for computing experiences which seamlessly leverage both WIMP paradigms as well as new experiences enabled by VR/AR/MR/XR. Certain embodiments provide for VR/AR/MR/XR enhancements such as virtual representations that can be implemented with the device (e.g., virtual graphical icons displayed on the device to augment the device) to improve usability. Embodiments of the present disclosure can provide position/operation mode detection, ergonomics for seamless 2D and 3D gripping by user, 3D tracking for providing virtual representations of the physical device, user hand presence detection, user hand position sensing for providing virtual representation of user interaction, user hand position sensing for grip-dependent functionality and mode switching, 2D and 3D gesture support, as well as other features.

Figure 1:
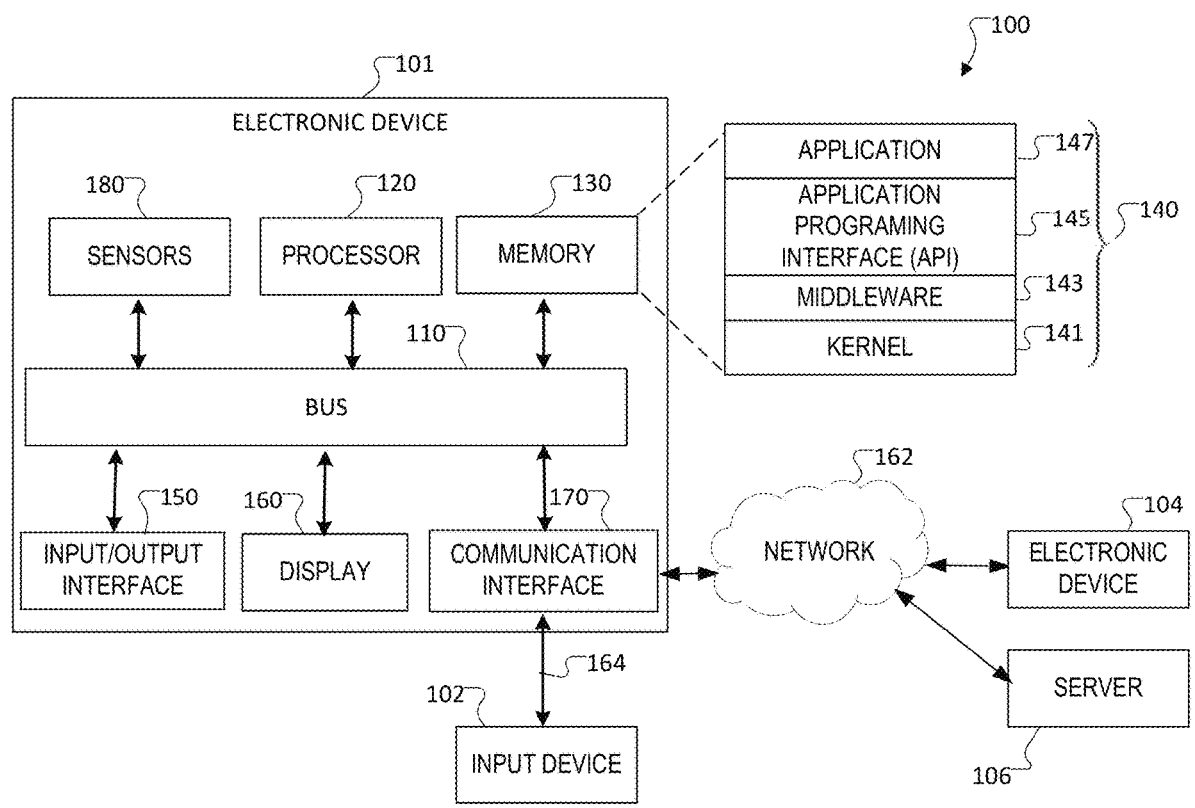
FIG. 1 illustrates an example of electronic device according to an embodiment of this disclosure.

FIG. 1 illustrates an example electronic device in a network environment 100 according to various embodiments of the present disclosure. The embodiment of the electronic device 101 and the network environment 100 shown in FIG. 1 is for illustration only. Other embodiments of the electronic device 101 and network environment 100 could be used without departing from the scope of this disclosure.

According to an embodiment of the present disclosure, an electronic device 101 is included in a network environment 100. The electronic device includes, or is coupled to, an input device 102. The electronic device 101 can include at least one of a bus 110, a processor 120, a memory 130, an input/output (IO) interface 150, a display 160, a communication interface 170, or sensors 180. In some embodiments, the electronic device 101 can exclude at least one of the components or can add another component.

The bus 110 includes a circuit for connecting the components 120 to 170 with one another and transferring communications (e.g., control messages and/or data) between the components.

The processor 120 includes one or more of a central processing unit (CPU), an application processor (AP), or a communication processor (CP). The processor 120 is able to perform control on at least one of the other components of the electronic device 101, and/or perform an operation or data processing relating to communication.

The memory 130 can include a volatile and/or non-volatile memory. For example, the memory 130 can store commands or data related to at least one other component of the electronic device 101. In various embodiments, the memory 130 can store spatial map data that can include mapping information of a real environment such as the interior of an office building, mall, house, amusement park, neighborhood or any other real world or virtual world mapping information utilized by an application 147 on the electronic device 101. According to an embodiment of the present disclosure, the memory 130 stores software and/or a program 140. The program 140 includes, e.g., a kernel 141, middleware 143, an application programming interface (API) 145, and/or an application program (or "application") 147. At least a portion of the kernel 141, middleware 143, or API 145 can be denoted an operating system (OS).

For example, the kernel 141 can control or manage system resources (e.g., the bus 110, processor 120, or a memory 130) used to perform operations or functions implemented in other programs (e.g., the middleware 143, API 145, or application program 147). The kernel 141 provides an interface that allows the middleware 143, the API 145, or the application 147 to access the individual components of the electronic device 101 to control or manage the system resources.

The middleware 143 can function as a relay to allow the API 145 or the application 147 to communicate data with the kernel 141, for example. A plurality of applications 147 can be provided. The middleware 143 is able to control work requests received from the applications 147, e.g., by allocating the priority of using the system resources of the electronic device 101 (e.g., the bus 110, the processor 120, or the memory 130) to at least one of the plurality of applications 147.

The API 145 is an interface allowing the application 147 to control functions provided from the kernel 141 or the middleware 143. For example, the API 145 includes at least one interface or function (e.g., a command) for filing control, window control, image processing, or text control.

The IO interface 150 serve as an interface that can, e.g., transfer commands or data input from a user or other external devices to other component(s) of the electronic device 101. Further, the IO interface 150 can output commands or data received from other component(s) of the electronic device 101 to the user or the other external device.

The display 160 includes, e.g., a liquid crystal display (LCD), a light emitting diode (LED) display, an organic light emitting diode (OLED) display, or a microelectromechanical systems (MEMS) display, or an electronic paper display. The display 160 is able to display, e.g., various contents (e.g., text, images, videos, icons, or symbols) to the user. The display 160 can include a touchscreen and may receive, e.g., a touch, gesture, proximity or hovering input using an electronic pen or a body portion of the user.

For example, the communication interface 170 is able to set up communication between the electronic device 101 and an external electronic device (e.g., a first electronic device 102, a second external electronic device 104, or a server 106). For example, the communication interface 170 can be connected with the network 162 or 164 through wireless or wired communication to communicate with the external electronic device. The communication interface 170 can be a wired or wireless transceiver or any other component for transmitting and receiving signals, such as video feeds or video streams.

Electronic device 101 further includes one or more sensors 180 that can meter a physical quantity or detect an activation state of the electronic device 101 and convert metered or detected information into an electrical signal. For example, sensor 180 can include one or more buttons for touch input, a camera, a gesture sensor, a gyroscope or gyro sensor, an air pressure sensor, a magnetic sensor or magnetometer, an acceleration sensor or accelerometer, a depth or distance sensor, a grip sensor, a proximity sensor, a color sensor (e.g., a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared sensor (IR) sensor, an ultrasound sensor, an iris sensor, a fingerprint sensor, and the like. The sensor(s) 180 can further include a control circuit for controlling at least one of the sensors included therein. Any of these sensor(s) 180 can be located within the electronic device 101. A camera sensor 180 can capture a plurality of frames for a single image to be combined by the processor 120.

The input device 102 is configured to detect a user motion and provide a corresponding command signal to the electronic device 101. For example, in response to a movement of the input device 102 by a user, the electronic device 102 communicates the command signal corresponding to the movement of the input device 102 to the electronic device 101. Additionally, an engagement, such as a pressing, of a button on the input device 102 can trigger a communication of the command signal. In certain embodiments, the input device 102 includes a touch pad and, in response to interactions with the touch pad, the input device 102 communicates the command signal. In response to the command signal, the electronic device 101 performs one or more functions. In certain embodiments, the input device 102 is coupled to the electronic device 101 via a wireless connection, such as a near-field connection such as BLUETOOTH, ZIGBEE, and the like, a magnetic connection, or an optical communication. In certain embodiments, the input device 102 is coupled to the electronic device via a wired or wireline connection.

In certain embodiments, an external electronic device, such as a wearable device or an electronic device 101-mountable wearable device (e.g., an optical head mounted display (HMD)) is provided. When the electronic device 101 is mounted in the HMD, the electronic device 101 detects the mounting in the HMD and operate in an augmented reality mode. In certain embodiments, the electronic device 101 detects the mounting in the HMD and operate in an augmented reality mode. When the electronic device 101 is mounted in the HMD, the electronic device 101 communicates with the HMD through the communication interface 170. The electronic device 101 can be directly connected with the HMD to communicate with the HMD without involving a separate network.

The wireless communication is able to uses a wireless communication medium, such as at least one of, e.g., long term evolution (LTE), long term evolution-advanced (LTE-A), 5th generation wireless system (5G), mm-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include at least one of universal serial bus (USB), high definition multimedia interface (HDMI), recommended standard 232 (RS-232), or plain old telephone service (POTS).

The network 162 includes at least one of communication networks. Examples of communication include a computer network (e.g., local area network (LAN) or wide area network (WAN)), Internet, or a telephone network.

The external electronic devices 104 and server 106 each can be a device of the same or a different type from the electronic device 101. According to certain embodiments of the present disclosure, the server 106 includes a group of one or more servers. According to certain embodiments of the present disclosure, all or some of operations executed on the electronic device 101 can be executed on another or multiple other electronic devices (e.g., the electronic device 104 or server 106). According to certain embodiments of the present disclosure, when the electronic device 101 should perform some function or service automatically or at a request, the electronic device 101, instead of executing the function or service on its own or additionally, can request another device (e.g., electronic device 104 or server 106) to perform at least some functions associated therewith. The other electronic device (e.g., electronic device 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique can be used, for example.

Although FIG. 1 shows that the electronic device 101 includes the communication interface 170 to communicate with the external electronic device 104 or server 106 via the network 162, the electronic device 101 can be independently operated without a separate communication function, according to an embodiment of the present disclosure.

The server 106 can support to drive the electronic device 101 by performing at least one of operations (or functions) implemented on the electronic device 101. For example, the server 106 can include a processing module or processor that may support the processor 120 implemented in the electronic device 101.

For example, the electronic device 101 can include an event processing module, such as within processor 120. The event processing module can process at least part of information obtained from other elements (e.g., the processor 120, the memory 130, the input/output interface 150, or the communication interface 170) and can provide the same to the user in various manners. The server event processing module can include at least one of the components of the event processing module and perform (or instead perform) at least one of the operations (or functions) conducted by the event processing module.

For example, according to an embodiment of the present disclosure, the event processing module processes information related to an event, which is generated while the electronic device 101 is mounted in a wearable device (e.g., the electronic device 102) to function as a display apparatus and to operate in the augmented reality mode, to fit the augmented reality mode and display the processed information. When the event generated while operating in the augmented reality mode is an event related to running an application, the event processing module can block the running of the application or process the application to operate as a background application or process. Additional information on the event processing module 185 may be provided through FIG. 2 described below.

The event processing module can be separate from the processor 120 or at least a portion of the event processing module can be included or implemented in the processor 120 or at least one other module, or the overall function of the event processing module can be included or implemented in the processor 120 shown or another processor. The event processing module can perform operations according to embodiments of the present disclosure in interoperation with at least one program 140 stored in the memory 130.

Figure 2:
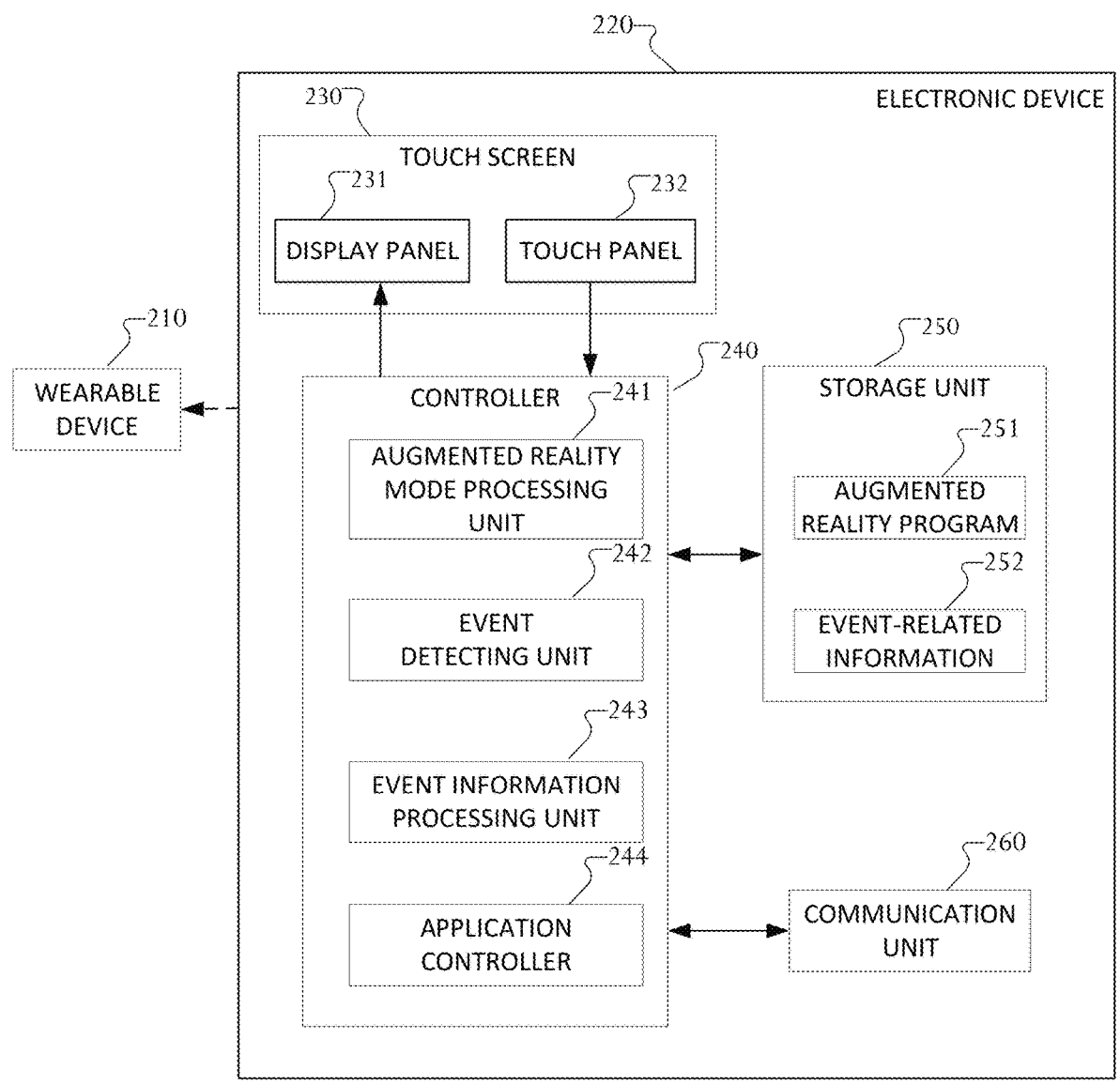
FIG. 2 is a block diagram illustrating an example configuration of an electronic device according to an embodiment of the present disclosure.

FIG. 2 illustrates an example electronic device 220 according to various embodiments of the present disclosure. The embodiment of the electronic device 220 shown in FIG. 2 is for illustration only. Other embodiments of electronic device 220 could be used without departing from the scope of this disclosure. The electronic device 220 depicted in FIG. 2 can be configured the same as, or similar to, any of electronic devices 101, 102, or 104.

FIG. 2 is a block diagram illustrating an example configuration of an electronic device according to an embodiment of the present disclosure. Referring to FIG. 2, the electronic device 220 according to an embodiment of the present disclosure can be an electronic device 220 having at least one display. In the following description, the electronic device 220 can be a device primarily performing a display function or can denote a normal electronic device including at least one display. For example, the electronic device 220 can be an electronic device (e.g., a smartphone) having a touchscreen 230.

According to certain embodiments, the electronic device 220 can include at least one of a touchscreen 230, a controller 240, a storage unit 250, or a communication unit 260. The touchscreen 230 can include a display panel 231 and/or a touch panel 232. The controller 240 can include at least one of an augmented reality mode processing unit 241, an event determining unit 242, an event information processing unit 243, or an application controller 244.

For example, when the electronic device 220 is mounted in a wearable device 210, the electronic device 220 can operate, e.g., as an HMD, and run an augmented reality mode. Further, according to an embodiment of the present disclosure, even when the electronic device 220 is not mounted in the wearable device 210, the electronic device 220 can run the augmented reality mode according to the user's settings or run an augmented reality mode related application. In the following embodiment, although the electronic device 220 is set to be mounted in the wearable device 210 to run the augmented reality mode, embodiments of the present disclosure are not limited thereto.

According to certain embodiments, when the electronic device 220 operates in the augmented reality mode (e.g., the electronic device 220 is mounted in the wearable device 210 to operate in a head mounted theater (HMT) mode), two screens corresponding to the user's eyes (left and right eye) can be displayed through the display panel 231.

According to certain embodiments, when the electronic device 220 is operated in the augmented reality mode, the controller 240 can control the processing of information related to an event generated while operating in the augmented reality mode to fit in the augmented reality mode and display the processed information. According to certain embodiments, when the event generated while operating in the augmented reality mode is an event related to running an application, the controller 240 can block the running of the application or process the application to operate as a background process or application.

More specifically, according to an embodiment of the present disclosure, the controller 240 can include at least one of an augmented reality mode processing unit 241, an event determining unit 242, an event information processing unit 243, or an application controller 244 to perform functions according to various embodiments of the present disclosure. An embodiment of the present disclosure can be implemented to perform various operations or functions as described below using at least one component of the electronic device 220 (e.g., the touchscreen 230, controller 240, or storage unit 250).

According to certain embodiments, when the electronic device 220 is mounted in the wearable device 210 or the augmented reality mode is run according to the user's setting or as an augmented reality mode-related application runs, the augmented reality mode processing unit 241 can process various functions related to the operation of the augmented reality mode. The augmented reality mode processing unit 241 can load at least one augmented reality program 251 stored in the storage unit 250 to perform various functions.

The event detecting unit 242 determines or detects that an event is generated while operated in the augmented reality mode by the augmented reality mode processing unit 241. Further, the event detecting unit 242 can determine whether there is information to be displayed on the display screen in relation with an event generated while operating in the augmented reality mode. Further, the event detecting unit 242 can determine that an application is to be run in relation with an event generated while operating in the augmented reality mode. Various embodiments of an application related to the type of event are described below.

The event information processing unit 243 can process the event-related information to be displayed on the display screen to fit the augmented reality mode when there is information to be displayed in relation with an event occurring while operating in the augmented reality mode depending on the result of determination by the event detecting unit 242. Various methods for processing the event-related information can apply. For example, when a three-dimensional (3D) image is implemented in the augmented reality mode, the electronic device 220 converts the event-related information to fit the 3D image. For example, event-related information being displayed in two dimensions (2D) can be converted into left and right eye information corresponding to the 3D image, and the converted information can then be synthesized and displayed on the display screen of the augmented reality mode being currently run.

When it is determined by the event detecting unit 242 that there is an application to be run in relation with the event occurring while operating in the augmented reality mode, the application controller 244 performs control to block the running of the application related to the event. According to certain embodiments, when it is determined by the event detecting unit 242 that there is an application to be run in relation with the event occurring while operating in the augmented reality mode, the application controller 244 can perform control so that the application is run in the background so as not to influence the running or screen display of the application corresponding to the augmented reality mode when the event-related application runs.

The storage unit 250 can store an augmented reality program 251. The augmented reality program 251 can be an application related to the augmented reality mode operation of the electronic device 220. The storage unit 250 can also store the event-related information 252. The event detecting unit 242 can reference the event-related information 252 stored in the storage unit 250 in order to determine whether the occurring event is to be displayed on the screen or to identify information on the application to be run in relation with the occurring event.

The wearable device 210 can be an electronic device including at least one function of the electronic device 101 shown in FIG. 1, and the wearable device 210 can be a wearable stand to which the electronic device 220 can be mounted. In case the wearable device 210 is an electronic device, when the electronic device 220 is mounted on the wearable device 210, various functions can be provided through the communication unit 260 of the electronic device 220. For example, when the electronic device 220 is mounted on the wearable device 210, the electronic device 220 can detect whether to be mounted on the wearable device 210 for communication with the wearable device 210 and can determine whether to operate in the augmented reality mode (or an HMT mode).

According to certain embodiments, upon failure to automatically determine whether the electronic device 220 is mounted when the communication unit 260 is mounted on the wearable device 210, the user can apply various embodiments of the present disclosure by running the augmented reality program 251 or selecting the augmented reality mode (or, the HMT mode). According to an embodiment of the present disclosure, when the wearable device 210 functions with or as part the electronic device 101, the wearable device can be implemented to automatically determine whether the electronic device 220 is mounted on the wearable device 210 and enable the running mode of the electronic device 220 to automatically switch to the augmented reality mode (or the HMT mode).

At least some functions of the controller 240 shown in FIG. 2 can be included in the event processing module 185 or processor 120 of the electronic device 101 shown in FIG. 1. The touchscreen 230 or display panel 231 shown in FIG. 2 can correspond to the display 160 of FIG. 1. The storage unit 250 shown in FIG. 2 can correspond to the memory 130 of FIG. 1.

Although in FIG. 2 the touchscreen 230 includes the display panel 231 and the touch panel 232, according to an embodiment of the present disclosure, the display panel 231 or the touch panel 232 may also be provided as a separate panel rather than being combined in a single touchscreen 230. Further, according to an embodiment of the present disclosure, the electronic device 220 can include the display panel 231, but exclude the touch panel 232.

According to certain embodiments, the electronic device 220 can be denoted as a first device (or a first electronic device), and the wearable device 210 may be denoted as a second device (or a second electronic device) for ease of description.

According to certain embodiments, an electronic device can comprise a display unit displaying on a screen corresponding to an augmented reality mode and a controller performing control that detects an interrupt according to an occurrence of at least one event, that varies event-related information related to the event in a form corresponding to the augmented reality mode, and that displays the varied event-related information on the display screen that corresponds to the augmented reality mode.

According to certain embodiments, the event can include any one or more selected from among a call reception event, a message reception event, an alarm notification, a scheduler notification, a wireless fidelity (Wi-Fi) connection, a WiFi disconnection, a low battery notification, a data permission or use restriction notification, a no application response notification, or an abnormal application termination notification.

According to certain embodiments, the electronic device further comprises a storage unit configured for storing the event-related information when the event is not an event to be displayed in the augmented reality mode, wherein the controller can perform control to display the event-related information stored in the storage unit when the electronic device switches from the virtual reality mode into an augmented reality mode or a see-through (non-augmented reality) mode. According to certain embodiments, the electronic device can further comprise a storage unit that stores information regarding at least one event to be displayed in the augmented reality mode. According to certain embodiments, the event can include an instant message reception notification event. According to certain embodiments, when the event is an event related to running at least one application, the controller can perform control that blocks running of the application according to occurrence of the event. According to certain embodiments, the controller can perform control to run the blocked application when a screen mode of the electronic device switches from a virtual reality mode into an augmented reality mode or a see-through (non-augmented reality) mode. According to certain embodiments, when the event is an event related to running at least one application, the controller can perform control that enables the application, according to the occurrence of the event, to be run on a background of a screen of the augmented reality mode. According to certain embodiments, when the electronic device is connected with a wearable device, the controller can perform control to run the augmented reality mode. According to certain embodiments, the controller can enable the event-related information to be arranged and processed to be displayed in a three dimensional (3D) space of the augmented reality mode screen being displayed on a current display screen. According to certain embodiments, the electronic device 220 can include additional sensors such as one or more red, green, blue (RGB) cameras, dynamic vision sensor (DVS) cameras, 360 degree cameras, or a combination thereof.

Figure 3:
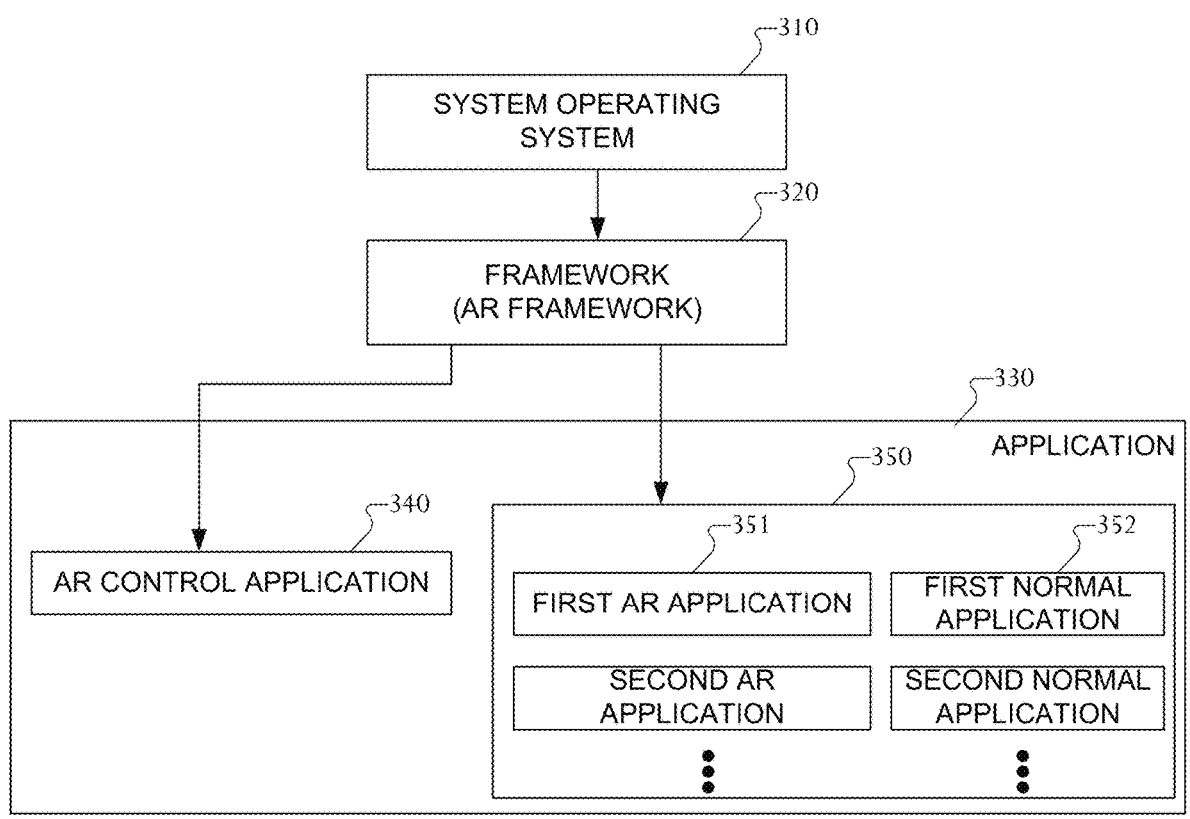
FIG. 3 is a block diagram illustrating a program module according to an embodiment of the present disclosure

FIG. 3 is a block diagram illustrating a program module according to an embodiment of the present disclosure. The embodiment illustrated in FIG. 3 is for illustration only and other embodiments could be used without departing from the scope of the present disclosure. In the example shown in FIG. 3, although an augmented reality (AR) system is depicted, at least some embodiments of the present disclosure apply equally to virtual reality (VR) and augmented reality (AR). Referring to FIG. 3, the program module can include a system operating system (e.g., an OS) 310, a framework 320, and an application(s) 330.

The system operating system 310 can include at least one system resource manager or at least one device driver. The system resource manager can perform, for example, control, allocation, or recovery of the system resources. The system resource manager may include at least one manager, such as a process manager, a memory manager, or a file system manager. The device driver may include at least one driver, such as, for example, a display driver, a camera driver, a BLUETOOTH driver, a shared memory driver, a USB driver, a keypad driver, a Wi-Fi driver, an audio driver, or an inter-process communication (IPC) driver.

According to certain embodiments, the framework 320 (e.g., middleware) can provide, for example, functions commonly required by an application or provide the application with various functions through an application programming interface (API) to allow the application to efficiently use limited system resources inside the electronic device.

The AR framework included in the framework 320 can control functions related to augmented reality mode operations on the electronic device. For example, when running an augmented reality mode operation, the AR framework 320 can control at least one AR application 351, which is related to augmented reality, among applications 330 so as to provide the augmented reality mode on the electronic device.

The application(s) 330 can include a plurality of applications and can include at least one AR application 351 running in the augmented-reality mode and at least one normal application 352 running in a non-augmented-reality mode.

The application(s) 330 can further include an AR control application 340. An operation of the at least one AR application 351 and/or at least one normal application 352 can be controlled by the AR control application 340.

When at least one event occurs while the electronic device operates in the augmented reality mode, the system operating system 310 can notify the framework 320, for example the AR framework, of an occurrence of an event.

The framework 320 can then control the running of the normal application 352 so that event-related information can be displayed on the screen for the event occurring in the non-augmented reality mode, but not in the augmented reality mode. When there is an application to be run in relation with the event occurring in the normal mode, the framework 320 can perform or provide control to run at least one normal application 352.

According to certain embodiments, when an event occurs while operating in the augmented reality mode, the framework 320, for example the AR framework, can block the operation of at least one normal application 352 to display the information related to the occurring event. The framework 320 can provide the event occurring, while operating in the augmented reality mode, to the AR control application 340.

The AR control application 340 can process the information related to the event occurring while operating in the augmented reality mode to fit within the operation of the augmented reality mode. For example, a 2D, planar event-related information can be processed into 3D information.

The AR control application 340 can control at least one AR application 351 currently running and can perform control to synthesize the processed event-related information for display on the screen being run by the AR application 351 and display the result of the event related information thereon.

According to certain embodiments, when an event occurs while operating in the augmented reality mode, the framework 320 can perform control to block the running of at least one normal application 352 related to the occurring event.

According to certain embodiments, when an event occurs while operating in the augmented reality mode, the framework 320 can perform control to temporarily block the running of at least one normal application 352 related to the occurring event, and then when the augmented reality mode terminates, the framework 320 can perform control to run the blocked normal application 352.

According to certain embodiments, when an event occurs while operating in the augmented reality mode, the framework 320 can control the running of at least one normal application 352 related to the occurring event so that the at least one normal application 352 related to the event operates in the background so as not to influence the screen used by the AR application 351 currently running.

Embodiments described in connection with FIG. 3 are examples for implementing an embodiment of the present disclosure in the form of a program, and embodiments of the present disclosure are not limited thereto and rather can be implemented in other various forms. Further, while the embodiment described in connection with FIGS. 2 and 3 references AR, it can be applied to other scenarios such as mixed reality, or virtual reality etc. Collectively the various reality scenarios can be referenced herein as extended reality (XR).

Figures 4A, 4B:
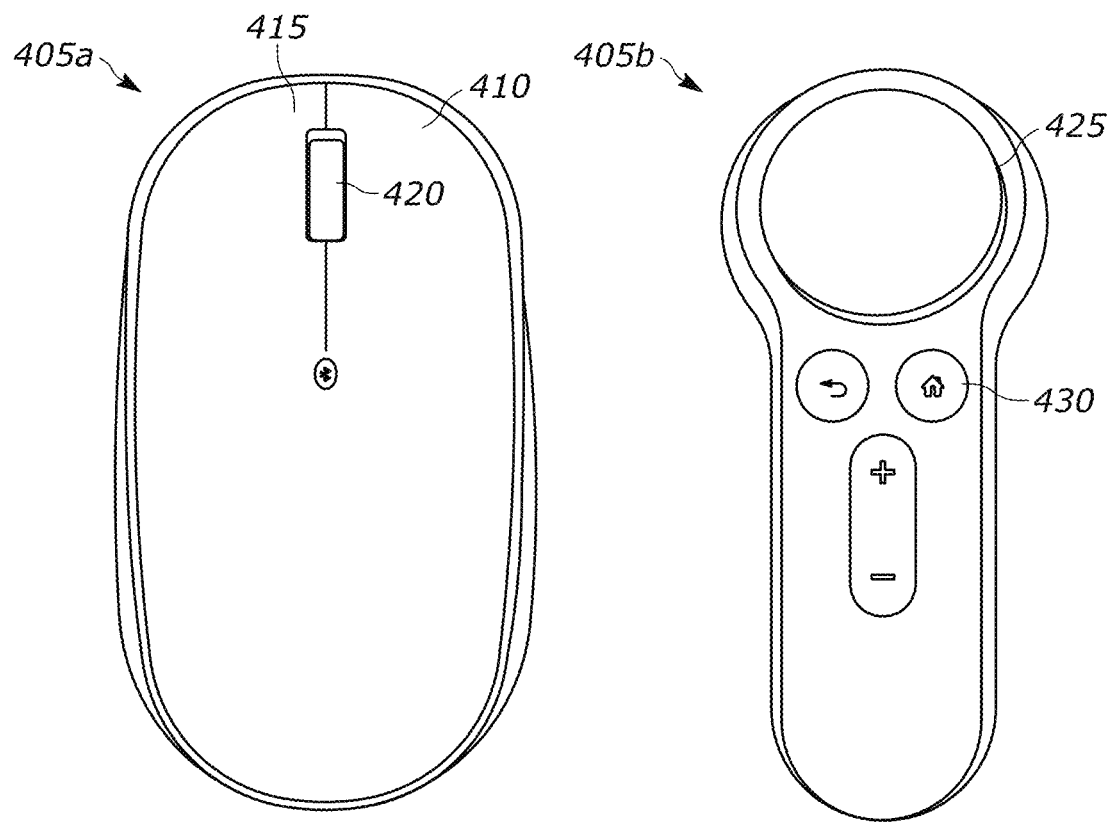
FIGS. 4A and 4B illustrate input devices according to this disclosure.

FIGS. 4A and 4B illustrate input devices according to this disclosure. The embodiments of the input devices 405a and 405b are for illustration only and other embodiments could be used without departing from the scope of the present disclosure.

A 2D input device 405a, such as what is commonly referred to as a "mouse", is configured to rest on a tactile surface, such as a surface of a desk, table, or other suitable flat and substantially horizontal surface. The 2D input device 405a converts lateral motion (in two dimensions), such as movement right, left, upward (away from an operator), downward (towards the operator), or diagonally, into respective command signals for manipulating one or more objects, such as a cursor or icon, on a screen of the electronic device 101 to which the 2D input device 405a is coupled. In certain embodiments, the 2D input device 405a includes one or more buttons such as a first data button 410, a second data button 415, and a scroll wheel 420 to provide commands to the electronic device, such as a command to open or execute a particular application. The 2D input device 405a is configured to provide 2D inputs to the electronic device 101. That is, the input device 405a is configured to detect motion in two dimensions and manipulate the cursor or icon in two dimensions.

A 3D input device 405b is configured to be held by an operator, such as away from a surface of a desk, table, or other suitable flat and substantially horizontal surface. The 3D input device 405b is able to track certain objects through at least three-degrees of freedom (3DOF). The 3D input device 405b includes sensors which track 3 or more degrees of freedom (DOF), such as 6DOF, typically orientation. The 3D input device 405b converts motion (in three dimensions), such as movement horizontally right, horizontally left, horizontally upward (away from an operator), horizontally downward (towards the operator), vertically upward (away from the surface or ground), vertically downward (towards the surface or ground), diagonally in any combination of the aforementioned directions, or rotationally, into respective command signals for manipulating one or more objects in a 3D environment on a screen of the electronic device 101 to which the 3D input device 405b is coupled. In certain embodiments, the 3D input device 405b includes a touch surface 425 and one or more buttons 430 to provide additional commands to the electronic device, such as a command to open or execute a particular application. The 3D input device 405b is configured to provide 3D inputs to the electronic device 101. That is, the 3D input device 405b is configured to detect motion in three dimensions and manipulate an object in three dimensions.

In the age of spatial computing, users with computers running VR/AR (and/or MR/XR) environments may require both computing mice, such as 2D input device 405a, as well as VR/AR controllers, such as 3D input device 405b. Such environments may often require users to frequently switch between input devices, or such otherwise environments may fall short when attempting to provide 2D precision using a 3D controller (or vice-versa).

VR also brings about unique challenges for the 2D input device 405a due to the inability for users to directly see the 2D input device 405a, such as while users are wearing VR headsets. This makes simple tasks, such as locating the 2D input device 405a or coordinating hand motions to buttons 410, 415 on the 2D input device 405a, more difficult. Many of these challenges have been addressed for 3D input device 405b (VR controllers) but not for traditional input devices.

Embodiments of the present disclosure provide a hybrid, multi-mode input device that is able to function as both a 2D input device, such as a computing mouse, as well as a 3D input device, such as a VR/AR/MR/XR controller. The hybrid, multi-mode input device enables computing experiences that seamlessly leverage both WIMP paradigms as well as new experiences enabled by VR/AR/MR/XR.

Certain embodiments can reduce the number of required input devices, thus decreasing the need to switch devices, and also improving portability. Certain embodiments can enable new workflows that seamlessly transition between multiple modalities, such as dragging from 2D mouse to 3D workspace. Certain embodiments can further improve the user experience of computing mouse operations through VR representations of the device and finger/grip positioning.

FIGS. 5A-5D illustrate an example multi-mode input device according to embodiments of the present disclosure. The example embodiment of the multi-mode input device 500 is for illustration only and other embodiments could be used without departing from the scope of the present disclosure.

The multi-mode input device 500 includes a housing 505 with an ergonomic design. The housing 505 can have a contoured portion that enables a user to comfortably place or rest a palm of their hand on the multi-mode input device 500. The contoured portion is also configured to enable the user to grip the multi-mode input device 500 with their hand.

Figure 5A:
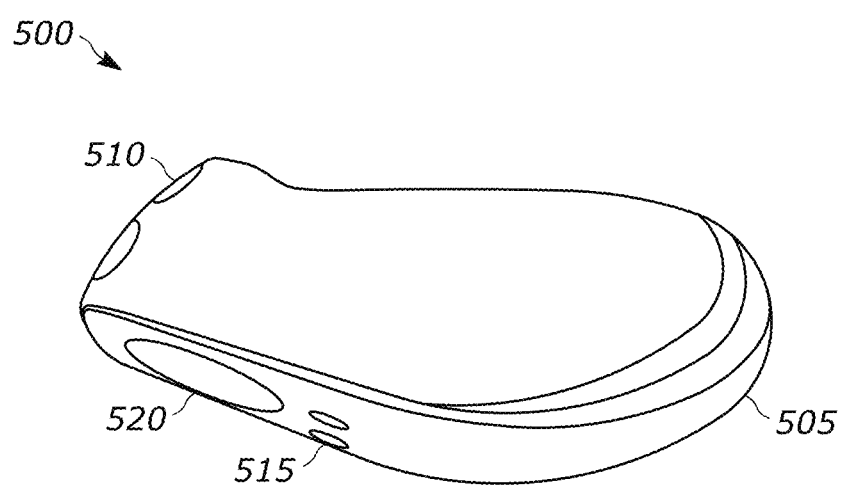
FIGS. 5A, 5B, 5C, and 5D illustrate a multi-mode input device according to embodiments of the present disclosure.
Figure 5B:
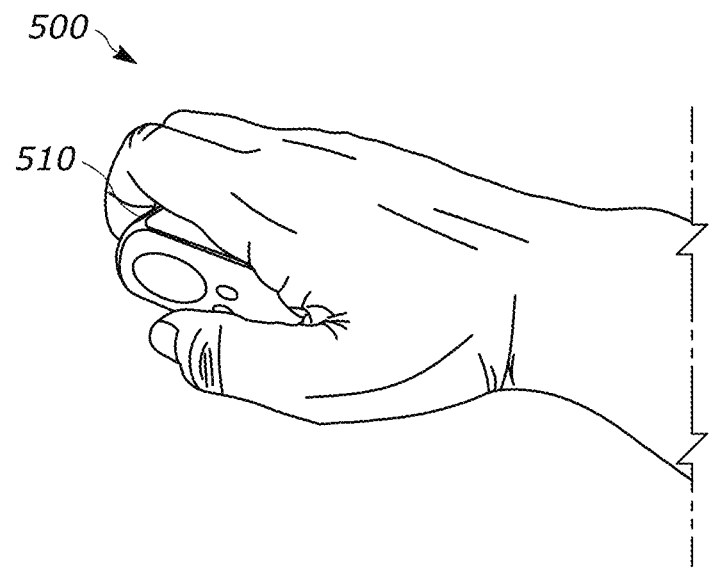

That is, the multi-mode input device 500 includes a 2D mouse configuration, as shown in FIG. 5B. The 2D mouse configuration can include 2 buttons and a scroll wheel, and is configured to provide 2D tracking. In operation of the 2D mouse configuration, a hand of the user is parallel to a tactile surface, such as a surface of a desk or table.

Figure 5C:
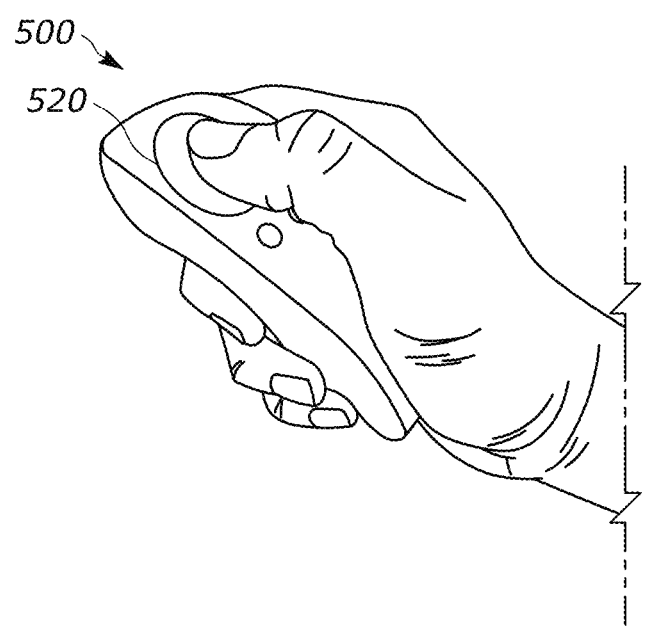
Figure 5D:
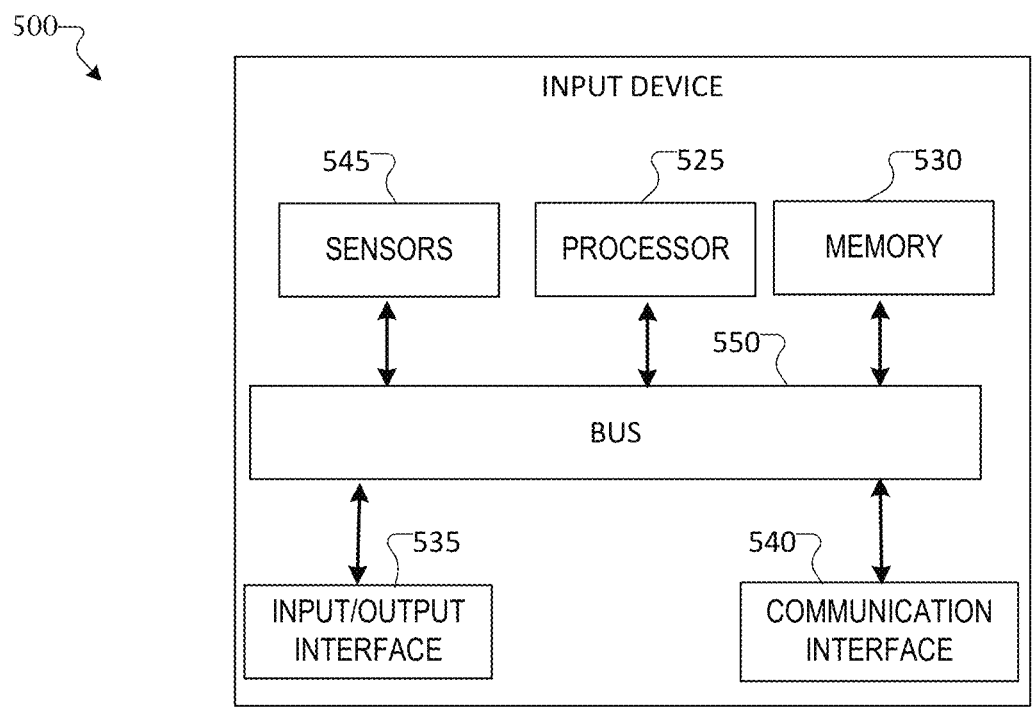
Figure 6A:
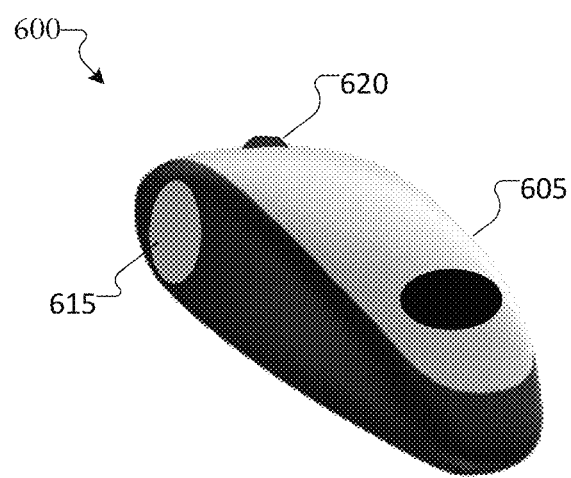
FIGS. 6A, 6B, 6C, and 6D illustrate another multi-mode input device according to embodiments of the present disclosure.
Figure 6B:
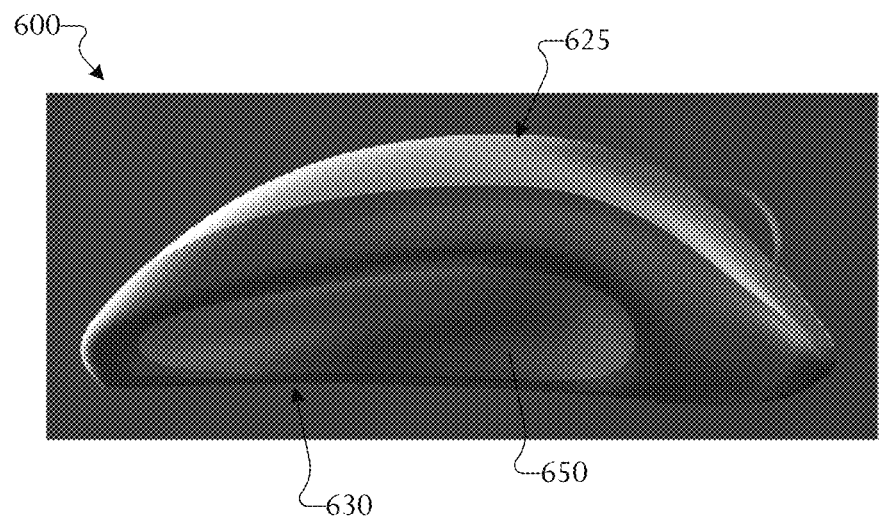
Figure 6C:
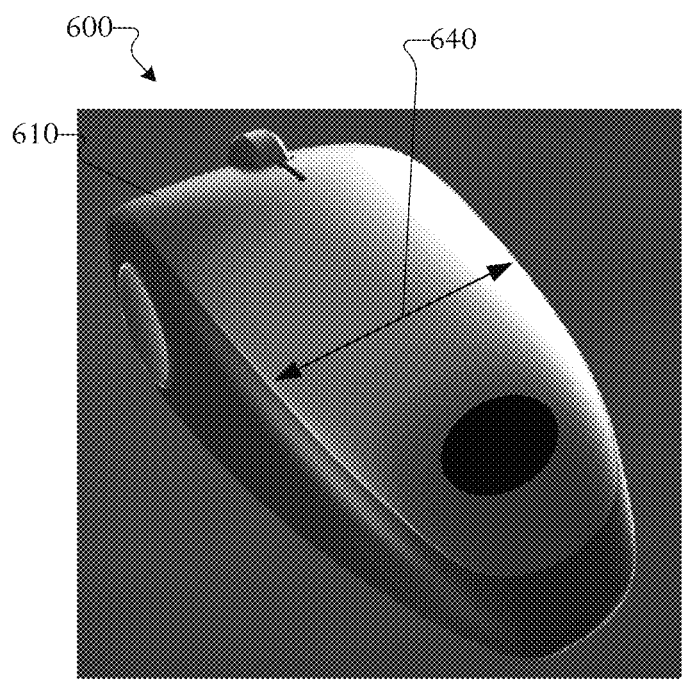
Figure 6D:
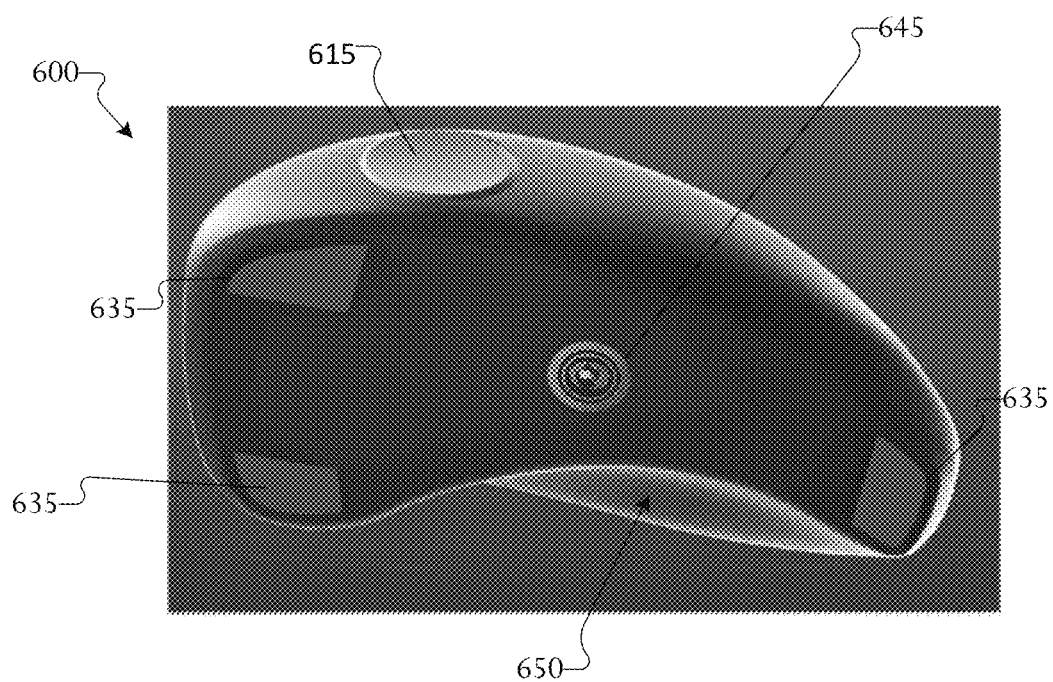

That is, the multi-mode input device 500 also includes a 3D controller configuration, as shown in FIG. 5C. The 3D controller configuration can include 2 triggers (switched function from buttons) and a trackpad, and is configured to provide 3D tracking. The multi-mode input device 500 can include a pocket, recess, or via to enable use of the multi-mode input device 500 as a pointer. In certain embodiments, the multi-mode input device 500 is comprised of soft materials for ease of use and gripping ergonomics. In operation of the 3D mouse configuration, a hand of the user can be perpendicular to a tactile surface, such as a surface of a desk or table. The multi-mode input device 500 is configured to transition between modes with minimal to no change of a grip of the user. The multi-mode input device 500 provides a natural transition between modes via a simple rotation of the multi-mode input device 500 by the hand of the user.

The multi-mode input device 500 also includes a first set of buttons 510. The first set of buttons 510 is positioned to be accessible by one or more fingers on a hand of the user while the user's hand is resting upon the multi-mode input device 500, such as, when the user is operating the multi-mode input device 500 in a 2D mode, similar to operating a computing mouse, as shown in the example illustrated in FIG. 5B. The multi-mode input device 500 also includes a second set of buttons 515. In certain embodiments, the multi-mode input device 500 includes a touch pad 520. The touch pad 520 can be a capacitive trackpad. The second set of buttons 515 and/or the touch pad 520 are positioned to be accessible by a thumb on the hand of the user while the user is gripping the multi-mode input device 500 in their hand, such as, when the user is operating the multi-mode input device 500 in a 3D mode, such as a VR/AR/MR/XR controller, as shown in the example illustrated in FIG. 5C.

In certain embodiments, one or more of the first set of buttons 510 are configured to be engaged while the multi-mode input device 500 is in the 3D mode illustrated in FIG. 5C. In certain embodiments, one of more of the second set of buttons 515 and/or the touch pad 520 are configured to be engaged while the multi-mode input device 500 is in the 2D mode illustrated in FIG. 5B.

The multi-mode input device 500 includes processing circuitry, such as processor 525, a memory 530, an input/output (IO) interface 535, a communication interface 540, or sensors 545. The multi-mode input device 500 can include a bus 550 configured to couple one or more of the processor 525, memory 530, IO interface 535, communication interface 540, or sensors 545.

The processor 525 includes one or more of a central processing unit (CPU), an application processor (AP), or a communication processor (CP). The processor 525 is able to perform control on at least one of the other components of the multi-mode input device 500, and/or perform an operation or data processing relating to an operational mode of the multi-mode input device 500.

The memory 530 can include a volatile and/or non-volatile memory. For example, the memory 530 can store commands or data related to operation and orientation of the multi-mode input device 500.

In certain embodiments, the multi-mode input device 500 includes one or more sensors 545. The sensors 545 include one or more sensors configured to measure, detect, or determine a position or an orientation of the multi-mode input device 500. For example, the multi-mode input device 500 can include one or more sensors 545 such as one or more of: one or more optic sensors, infrared sensors, an accelerometer, gyroscopic sensor, a magnetometer, a grip-position sensor, or an orientation sensor system. The orientation sensor system can be a virtual sensor that uses one or more algorithms to combine information from one or more of: an accelerometer, gyroscopic sensor, or a magnetometer. In certain embodiments, the magnetometer is configured to perform 6DOF electromagnetic field tracking. In certain embodiments, the multi-mode input device 500 includes an electromagnetic coil to track position and control modes. In certain embodiments, the multi-mode input device 500 includes an inertial measurement unit (IMU) to track position and control modes. In certain embodiments, the multi-mode input device 500 includes a machine vision circuit, such as one or more visible or infrared (IR) emitters and/or receivers, to track position and control modes. In certain embodiments, the multi-mode input device 500 includes a plurality of touch sensors and/or switches to determine hand/grip position of a user to control modes. In certain embodiments, the multi-mode input device 500 uses a combination of sensors, IMU, electromagnetic coils, and machine vision circuit to track position and control modes. In certain embodiments, the multi-mode input device 500 includes a combined positioned sensor configured to detect motions in the 2D and 3D plane. For example, the combined positioned sensor can be configured to detect that the multi-mode input device 500 resting on a tactile surface and detect lateral movements of the multi-mode input device 500 when the multi-mode input device 500 is operating as a computer mouse. Additionally, the combined position sensor can be configured to detect that the multi-mode input device 500 has been lifted from the tactile surface and thereafter detect 6DOF motions in space, such as when the multi-mode input device 500 is operating as a controller. In certain embodiments, the 3D position sensor comprises a plurality of video cameras configured to measure a position of the input device relative to an initial position. That is, the system is configured to detect and identify 3D motion based on a compared succession of images or a compared current position to a previous or initial position.

The IO interface 535 can include one or more of a data input buttons or a touch pad. In certain embodiments, the touch pad includes a capacitive trackpad. In certain embodiments, the IO interface 535 includes a mode switch. The mode switch is configured to be engaged by the user to switch the multi-mode input device 500 from a first mode including a 2D mode, such as a computing mouse, as shown in the example illustrated in FIG. 5B, and a second mode including a 3D mode, such as a VR/AR/MR/XR controller ("controller"), as shown in the example illustrated in FIG. 5C.

The computer interface 540 includes a communication circuit, such as a transmitter or transceiver, configured to communicate orientation data and command data to an electronic device to which the multi-mode input device 500 is coupled. In certain embodiments, the multi-mode input device 500 communicates orientation data to the electronic device 101. For example, the multi-mode input device 500 can communicate indicator information, such as a 2D indicator indicating that the multi-mode input device 500 is operating in a 2D mode or a 3D indicator indicating that the multi-mode input device 500 is operating in a 3D mode.

The processor 525 is configured to determine an orientation of the multi-mode input device 500. In certain embodiments, the processor 525 receives positional data, orientation data, or both from one or more sensors 545. In certain embodiments, the processor 525 detects a switch position or receives a signal indicating a switch position. Therefore, processor 525 is configured to perform position and operation mode detection. Through the one or more sensors 525, the switch (IO interface 535), or both, the processor 525 is configured to detect a position of the multi-mode input device 500, a gesture by the multi-mode input device 500, a hand activity corresponding to the multi-mode input device 500, a physical input of the multi-mode input device 500. The position can include one or more of: elevation, orientation, or specific areas of movement. The gesture can include ore or more of: acceleration or movement in one or more patterns by the multi-mode input device 500. The hand activity can include a first activity in which the multi-mode input device 500 is held in a fashion similar to that in which a computer mouse is held, a second activity in which the multi-mode input device 500 is held in a fashion similar to which a 3D controller is held, or an absent position in which no hand is present. The physical input can include engagement of a specified button, a switch, a tap region, a grip-position sensor, or the like. In certain embodiments, the processor 525 is configured detect the orientation as a function of the application being executed on the electronic device 101. That is, in certain embodiments, the 2D mode/3D mode switching is application specific. In certain embodiments, the processor 525 is configured to perform one or more of: hand presence detection, hand position sensing for virtual representation of human interaction, or hand position sensing for grip-dependent functionality and mode switching.

Therefore, the multi-mode input device 500 is configured to provide: a contoured housing having ergonomics affording seamless 2D and 3D grip; hand presence detection; hand position sensing for virtual representation of human interaction; hand position sensing for grip-dependent functionality and mode switching. The multi-mode input device 500 is configured to enable 3D tracking for virtual representations of the physical device and 2D and 3D gesture support. In certain embodiments, based on communications between the electronic device 101 and the multi-mode input device 500, the electronic device 101 is configured to provide virtual representations, such as mouse position and orientation, cursor or icon contextual shapes, and hand position representations. The mouse position and orientation enables or assists a user to find the multi-mode input device 500 and enhances intuition and use. The hand representations include indications regarding which buttons respective fingers of the user are on or near or representations of a hand indicating how the device is held within the hand. The multi-mode input device 500 includes a mouse and icon (pointer or shape) that provide for personal customization, contextual shapes (such as being more arrow shaped when in a "pointer" mode) and color highlights indicating actional areas, such as active buttons or an active trackpad.

FIGS. 6A-6D illustrate another multi-mode input device according to embodiments of the present disclosure. The embodiment of the multi-mode input device 600 is for illustration only and other embodiments could be used without departing from the scope of the present disclosure. The multi-mode input device 600 can be the same as, or include similar features as, the multi-mode input device 500. For example, the multi-mode input device 600 can include one or more of: a processor 525, memory 530, IO interface 535, communication interface 540, sensors 545, or bus 550.

The multi-mode input device 600 includes a contoured housing 605. The multi-mode input device 600 also includes one or more of: one or more input buttons 610, a touch pad 615, toggle, or thumb button, or a scroll wheel 620.

The contoured housing 605 includes a curved top surface 625. The curved top surface 625 is dimensioned to fit comfortably when a hand of the user is resting on the curved top surface 625. That is, the curved top surface 625 is ergonomically designed to fit within a palm of the hand of the user when the hand of the user is resting upon the multi-mode input device 600. The contoured housing 605 also includes a bottom surface 630 that is substantially flat. That is, the bottom surface is flat but may include one or more glides 635 that may protrude from the flat bottom surface 630. Additionally, the contoured housing 605 may include one or more indentions, such as configured to enable access to a battery compartment or a charge port. The bottom surface 630 may also include an optic sensor 645, or track ball, configured to detect or measure lateral motion of the multi-mode input device 600 along a tactile surface, such as a surface of a desk or table. Therefore, the bottom surface 630 is flat, but may have one or more protrusions or indentions, thus rendering the bottom surface 630 substantially flat. The contoured housing 605 is dimensioned to have a width 640 configured to enable the multi-mode input device 600 to comfortable fit between a thumb and a fifth digit, also known as a "little finger" or "pinky" (namely, the most ulnar and smallest finger of a hand, opposite the thumb, and next to the ring finger), of a hand of the user. The contoured housing 605 also includes a recess 650 on a lateral edge of the contoured housing 605. The recess 650 can extend from the bottom surface 630 to at least half way up the lateral surface toward the curved top surface 625. The recess 650 is dimensioned to be ergonomically comfortable to a user when a hand of the user is gripping the multi-mode input device 600 and provides ergonomics for 2D use and 3D gripping. For example, the recess 650 can be dimensioned to accommodate one or more of the fourth digit (namely, the "ring finger") and the fifth digit of the hand of the user while the user is holding the multi-mode input device 600 within the hand of the user. That is, when the user grips the multi-mode input device 600 and lifts the multi-mode input device 600 away from a tactile surface, such as a surface of a desk or table, a hand of the user envelopes and grips the multi-mode input device 600 such that one or more fingers of the hand engage, contact, or fit partially within the recess 650.

Figure 7:
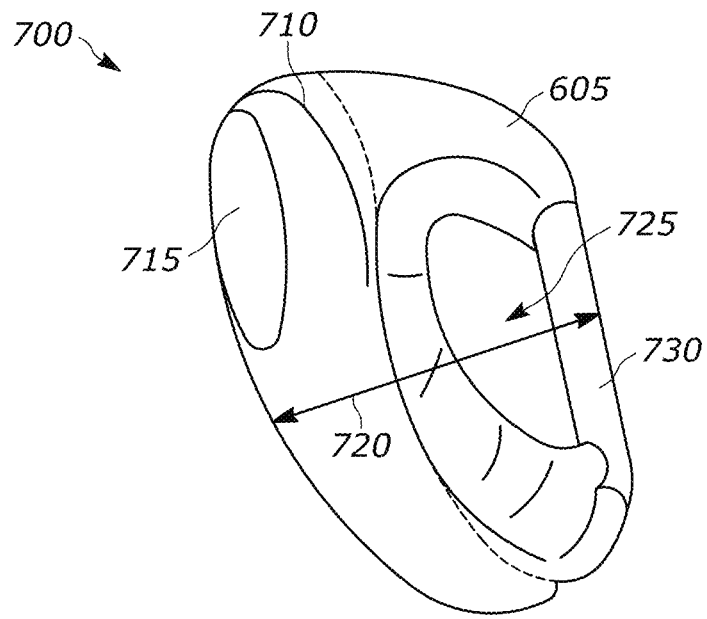
FIG. 7 illustrates another multi-mode input device according to embodiments of the present disclosure.

FIG. 7 illustrates another multi-mode input device according to embodiments of the present disclosure. The embodiment of the multi-mode input device 700 is for illustration only and other embodiments could be used without departing from the scope of the present disclosure. The multi-mode input device 700 can be the same as, or include similar features as, the multi-mode input device 500 or multi-mode input device 600. For example, the multi-mode input device 700 can include one or more of: a processor 525, memory 530, IO interface 535, communication interface 540, sensors 545, or bus 550.

The multi-mode input device 700 includes a contoured housing 705. The multi-mode input device 700 also includes one or more of: one or more input buttons 710, a touch pad 715, toggle, or thumb button, or a scroll wheel (not shown).

The contoured housing 705 includes a top surface. The top surface is dimensioned to fit comfortably when a hand of the user is resting on the top surface. That is, the top surface is ergonomically designed to fit within a palm of the hand of the user when the hand of the user is resting upon the multi-mode input device 700. The contoured housing 705 also includes a bottom surface that is substantially flat. That is, the bottom surface is flat but may include one or more glides that may protrude from the flat bottom surface. Additionally, the contoured housing 705 may include one or more indentions, such as configured to enable access to a battery compartment or a charge port. The bottom surface may also include an optic sensor, or track ball, configured to detect or measure lateral motion of the multi-mode input device 700 along a tactile surface, such as a surface of a desk or table. Therefore, the bottom surface is flat, but may have one or more protrusions or indentions, thus rendering the bottom surface substantially flat. The contoured housing 705 is dimensioned such that a width 720 of the multi-mode input device 700 enables the multi-mode input device 700 to comfortably fit between a thumb and a fifth digit of a hand of the user. The contoured housing 705 also includes an arced opening or via 725. A circumferential edge of the via 725 includes a portion formed by the contoured housing 705 and a portion formed by a switch 730. The via 725 is dimensioned to enable the contoured housing 705 to be ergonomically comfortable to a user when a hand of the user is gripping the multi-mode input device 700. For example, the via 720 can be dimensioned to accommodate one or more of the fourth digit (namely, the "ring finger") and the fifth digit of the hand of the user while the user is holding the multi-mode input device 700 within the hand of the user. That is, when the user grips the multi-mode input device 700 and lifts the multi-mode input device 700 away from a tactile surface, such as a surface of a desk or table, a hand of the user envelopes and grips the multi-mode input device 700 such that one or more fingers of the hand engage the switch 730 and fit partially within the via 725. For example, as a user picks-up the multi-mode input device 700, one or more fingers engage a lever arm of the switch 730, depressing the lever arm inwards toward the via 725 enabling the user to grip the contoured housing 705 and lever arm of the switch 730 within the hand of the user.

The processor, such as processor 525, is able to detect that the switch 730 is engaged and determines that the multi-mode input device 700 is to operate in a 3D mode. For example, when the user picks-up the multi-mode input device 700 and engages (i.e., presses) the lever arm of the switch 630, the switch 630 can transmits a signal to the processor 525 indicating that the multi-mode input device 700 is gripped in a hand of the user and is to operate in the 3D mode as a 3D controller. In certain embodiments, the processor 525 detects that the lever arm of the switch 730 has been engaged. For example, the lever arm of the switch 730 may close an electrical circuit to which the processor 525 also is coupled. When the lever arm of the switch 730 is engaged, the movement of the lever arm opens the circuit. Thereafter, the processor 525 detects the open circuit, such as by detecting an interruption in a current flow.

Figure 8:
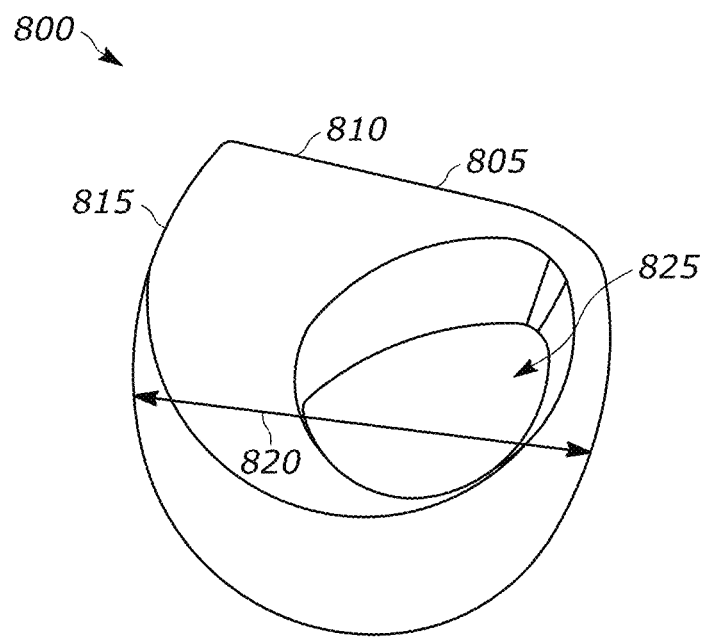
FIG. 8 illustrates another multi-mode input device according to embodiments of the present disclosure.

FIG. 8 illustrates another multi-mode input device according to embodiments of the present disclosure. The embodiment of the multi-mode input device 800 is for illustration only and other embodiments could be used without departing from the scope of the present disclosure. The multi-mode input device 800 can be the same as, or include similar features as, the multi-mode input device 500, the multi-mode input device 600 or the multi-mode input device 700. For example, the multi-mode input device 800 can include one or more of: a processor 525, memory 530, IO interface 535, communication interface 540, sensors 545, or bus 550.

The multi-mode input device 800 includes a contoured housing 805. The multi-mode input device 800 also includes one or more of: one or more input buttons 810, a touch pad 815, toggle, or thumb button, or a scroll wheel (not shown).

The contoured housing 805 includes a top surface. The top surface is dimensioned to fit comfortably when a hand of the user is resting on the top surface. That is, the top surface is ergonomically designed to fit within a palm of the hand of the user when the hand of the user is resting upon the multi-mode input device 800. The contoured housing 805 also includes a bottom surface that is substantially flat. That is, the bottom surface is flat but may include one or more glides that may protrude from the flat bottom surface. Additionally, the contoured housing 805 may include one or more indentions, such as configured to enable access to a battery compartment or a charge port. The bottom surface may also include an optic sensor, or track ball, configured to detect or measure lateral motion of the multi-mode input device 800 along a tactile surface, such as a surface of a desk or table. Therefore, the bottom surface is flat, but may have one or more protrusions or indentions, thus rendering the bottom surface substantially flat. The contoured housing 805 is dimensioned such that a width 820 of the multi-mode input device 800 enables the multi-mode input device 800 to comfortably fit between a thumb and a fifth digit of a hand of the user. The contoured housing 805 also includes a via 825. The via 825 is dimensioned to enable the contoured housing 805 to be ergonomically comfortable to a user when a hand of the user is gripping the multi-mode input device 800. For example, the via 820 can be dimensioned to accommodate one or more of the second digit (namely the "pointer finger"), the third digit (namely the "middle finger"), the fourth digit, and the fifth digit of the hand of the user while the user is holding the multi-mode input device 800 within the hand of the user. That is, when the user grips the multi-mode input device 800 and lifts the multi-mode input device 800 away from a tactile surface, such as a surface of a desk or table, a hand of the user envelopes and grips the multi-mode input device 8700 such that one or more fingers fit partially within or through the via 825.

Figure 9A:
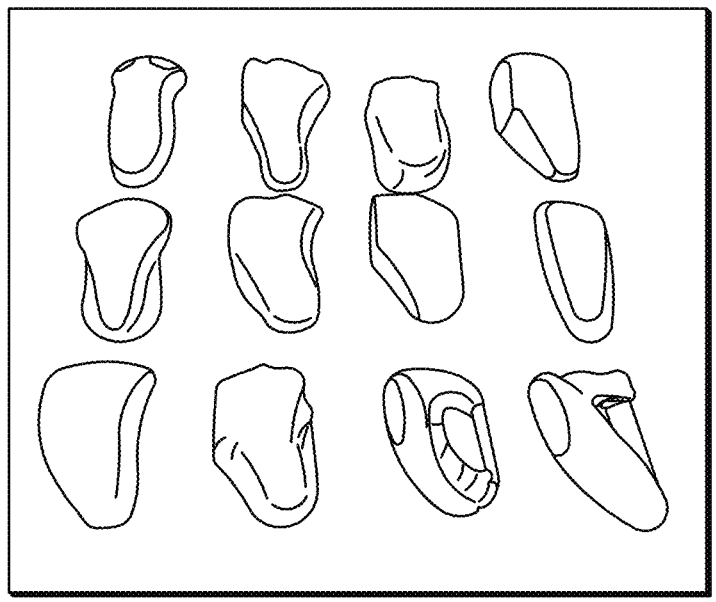
FIGS. 9A and 9B illustrates different multi-mode input devices according to embodiments of the present disclosure.
Figure 9B:
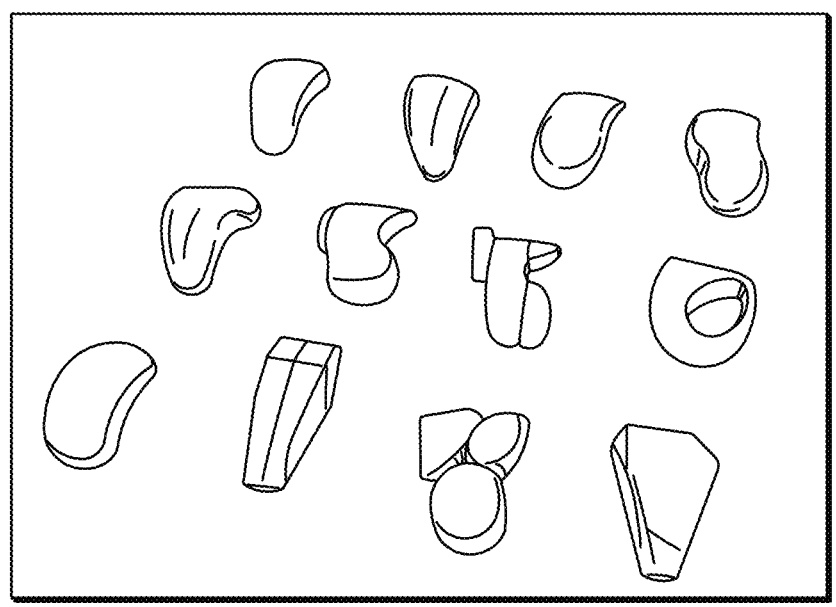

FIGS. 9A and 9B illustrates different multi-mode input devices according to embodiments of the present disclosure. The embodiments of the multi-mode input devices shown in FIGS. 9A and 9B are for illustration only and other embodiments could be used without departing from the scope of the present disclosure. Each of the multi-mode input device can be the same as, or include similar features as, the multi-mode input device 500, the multi-mode input device 600, the multi-mode input device 700, or multi-mode input device 800. For example, each of the multi-mode input devices shown in FIGS. 9A and 9B can include a contoured housing and one or more of: a processor 525, memory 530, IO interface 535, communication interface 540, sensors 545, bus 550, touch pad, data buttons, recesses, or vias.

Figure 10A:
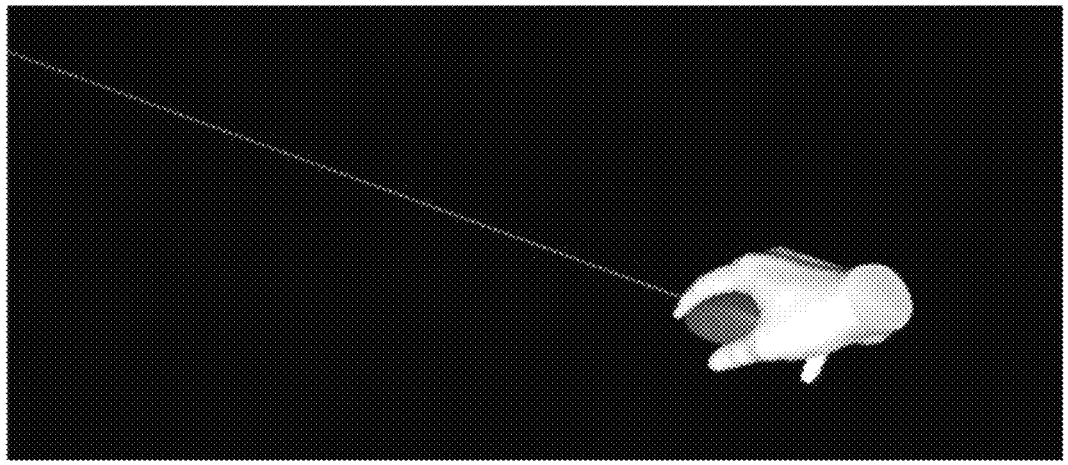
FIGS. 10A, 10B, and 10C illustrates a transition in operation mode from two-dimensions (2D) to three-dimensions (3D) according to embodiments of the present disclosure.
Figure 10B:
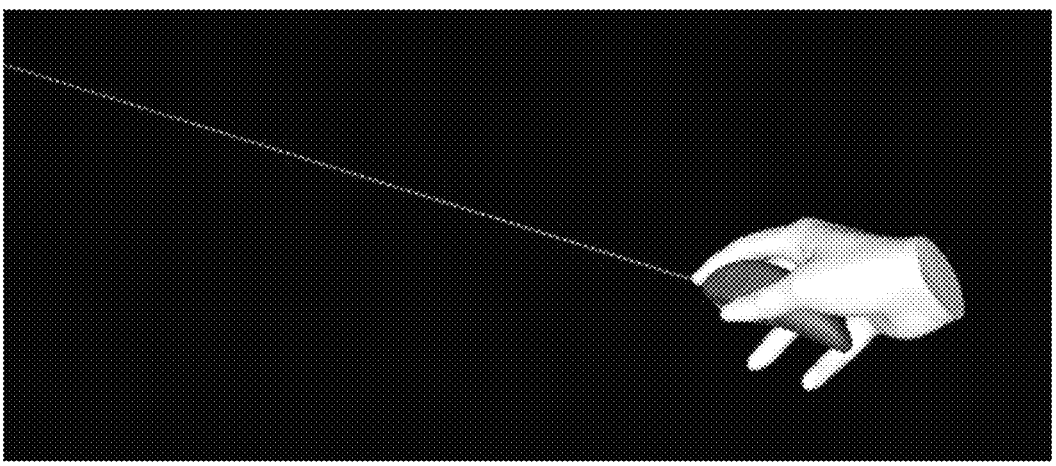
Figure 10C:
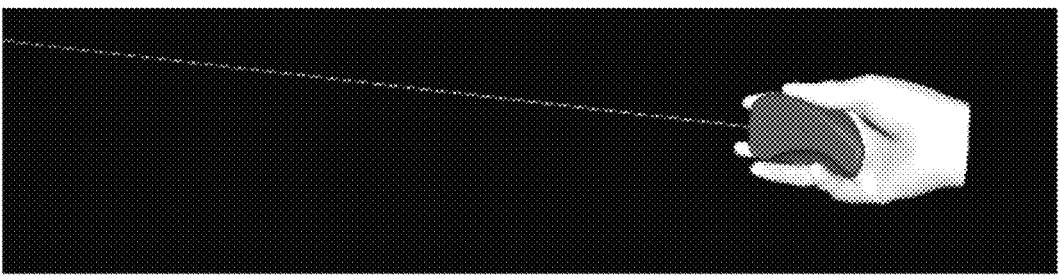

FIGS. 10A-10C illustrates a transition in operation mode from 2D to 3D according to embodiments of the present disclosure. The embodiment of the transition shown in FIGS. 10A-10C is for illustration only and other embodiments could be used without departing from the scope of the present disclosure. Although the examples disclosed in FIGS. 10A-10C reference multi-mode input device 500, embodiments with any of the multi-mode input devices 600, 700, or 800, apply equally.

In the example shown in FIG. 10A, a user is operating a multi-mode input device 500 in a 2D plane. That is, the multi-mode input device 500 is operated on a flat, tactile surface, such as a surface of a desk or table. The multi-mode input device 500 provides a 2D input to a connected computing device, such as electronic device 101.

In the example shown in FIG. 10B, a user lifts the multi-mode input device 500 from the 2D plane into 3D space. For example, the user lifts the multi-mode input device 500 into the air space above the flat, tactile surface.

In the example shown in FIG. 10C, the user operates the multi-mode input device 500 in 3D space. That is, the multi-mode input device 500 can be moved about in the air. By moving the multi-mode input device 500 through space, the multi-mode input device 500 provides 3D input to the computing device.

Figure 11A:
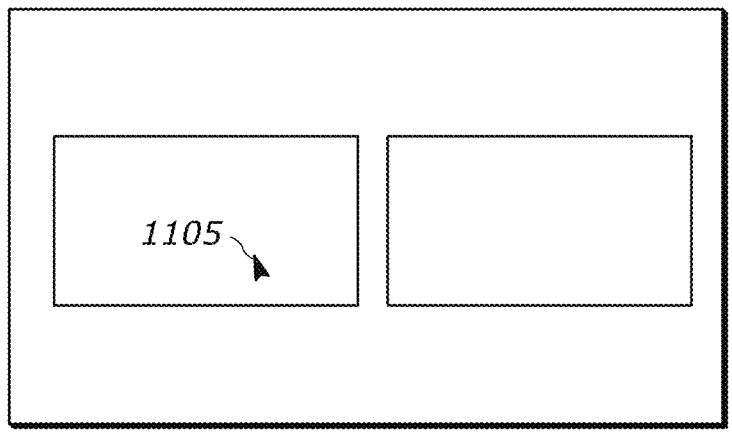
FIGS. 11A and 11B illustrate a transition of a cursor or object display from 2D to 3D according to embodiments of the present disclosure.
Figure 11B:
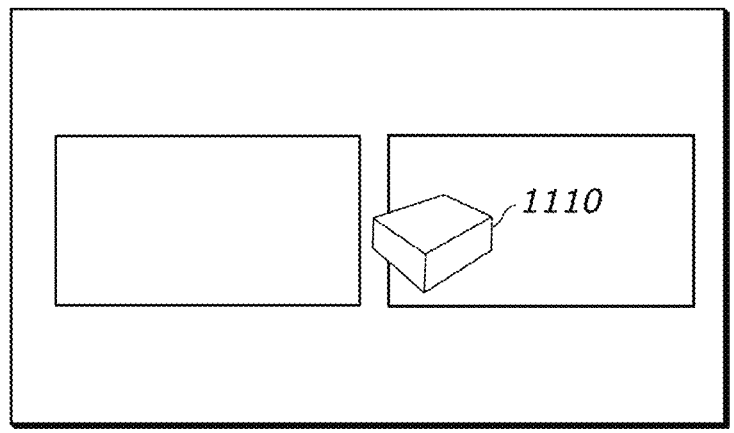

FIGS. 11A and 11B illustrate a transition of a cursor or object display from 2D to 3D according to embodiments of the present disclosure. The embodiment of the transition shown in FIGS. 11A and 11B is for illustration only and other embodiments could be used without departing from the scope of the present disclosure. Although the examples disclosed in FIGS. 11A and 11B reference multi-mode input device 500, embodiments with any of the multi-mode input devices 600, 700, or 800, apply equally.

In the example shown in FIG. 11A, the multi-mode input device 500 is operating in a 2D plane, such as shown in FIG. 10A. The multi-mode input device 500 provides, to the attached computing device, such as electronic device 101, a planar position of multi-mode input device 500. The computing device displays, such as on a display 231, a 2D pointer 1105 as a cursor. The 2D pointer 1105 illustrates that the multi-mode input device 500 is operating in a 2D plane. The 2D pointer 1105 also can provide a spatial position of the multi-mode input device 500.

In the example shown in FIG. 11B, the multi-mode input device 500 is operating in a 3D space, such as shown in FIG. 10C. The multi-mode input device 500 provides, to the attached computing device, such as electronic device 101, a spatial position of multi-mode input device 500. In certain embodiments, the spatial position is based on 3DOF information. In certain embodiments, the spatial position is based on 6DOF information. The computing device displays, such as on a display 231, a 3D object 1110. The 3D object 1110 illustrates that the multi-mode input device 500 is operating in a 3D space. The 3D object 1110 also can provide a spatial position and orientation of the multi-mode input device 500 via movement and rotation of the 3D object 1110 when the multi-mode input device 500 is operating in 3D space.

Figure 12:
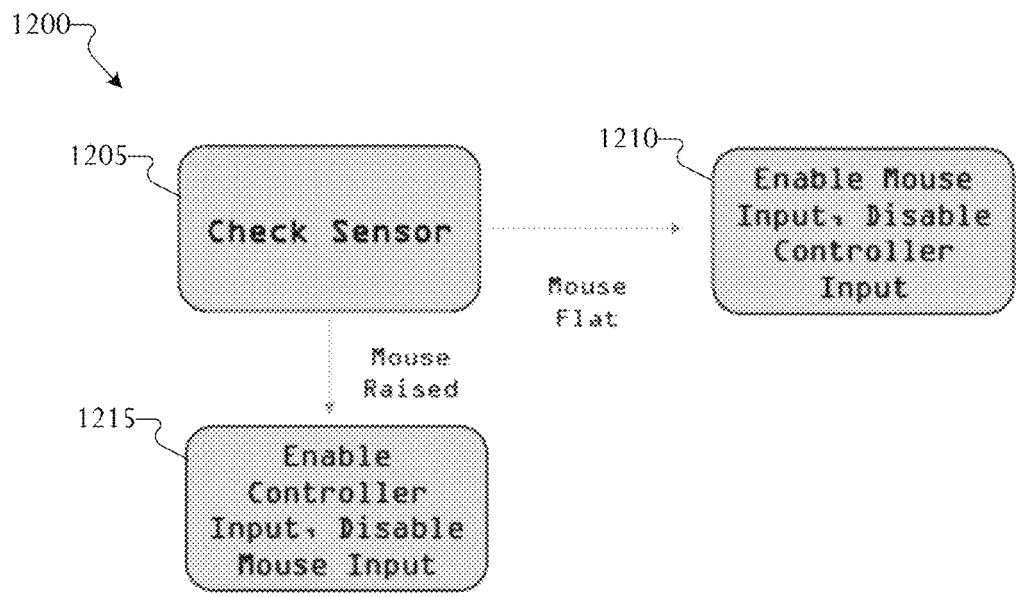
FIG. 12 illustrates a process for using sensor data to automatically transition between modes according to embodiments of the present disclosure.

FIG. 12 illustrates a process for using sensor data to automatically transition between modes according to embodiments of the present disclosure. The embodiment of the transition 1200 shown in FIG. 12 is for illustration only and other embodiments could be used without departing from the scope of the present disclosure. Although the example disclosed in FIG. 12 references multi-mode input device 500, embodiments with any of the multi-mode input devices 600, 700, or 800, apply equally.

In block 1205, the processor 525 checks one or more sensors of the multi-mode input device 500. The processor 525 reads, without an input or command received from the user, one or more measurements from sensor 545. For example, the processor 525 may receive a measurement signal from one or more sensors indicating that the multi-mode input device 500 is flat or raised. If the processor 525 determines that the multi-mode input device 500 is flat, such as from the multi-mode input device 500 resting on the tactile surface, the processor 525 enables a 2D operating mode in block 1210. In the 2D operating mode, the processor 525 enables a mouse input and disables a controller input. If the processor 525 determines that the multi-mode input device 500 is raised, such the multi-mode input device 500 is lifted away from the tactile surface, the processor 525 enables a 3D operating mode in block 1215. In the 3D operating mode, the processor 525 enables a 3D controller input and disables a 2D mouse input.

Figure 13:
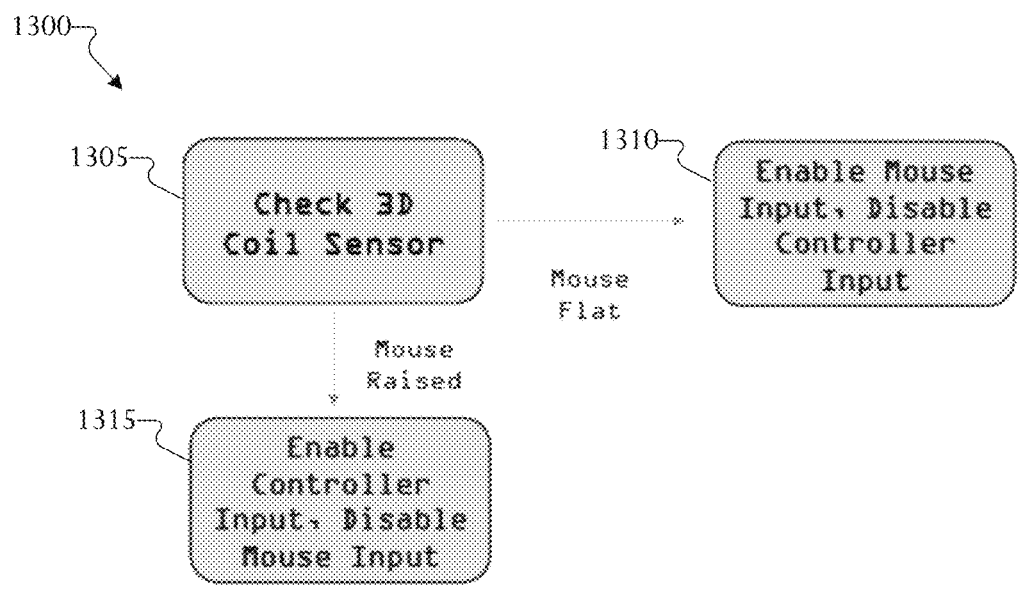
FIG. 13 illustrates a process for using an electromagnetic coil sensor data to automatically transition between modes according to embodiments of the present disclosure.

FIG. 13 illustrates a process for using an electromagnetic coil sensor data to automatically transition between modes according to embodiments of the present disclosure. The embodiment of the transition 1300 shown in FIG. 13 is for illustration only and other embodiments could be used without departing from the scope of the present disclosure. Although the example disclosed in FIG. 13 references multi-mode input device 500, embodiments with any of the multi-mode input devices 600, 700, or 800, apply equally.

In block 1305, the processor 525 checks one or more sensors of the multi-mode input device 500. The processor

525 reads, without an input or command received from the user, one or more measurements from an electromagnetic coil system or electromagnetic coil sensor, such as sensor 545. For example, the processor 525 may receive a measurement signal from the electromagnetic coil system indicating that the multi-mode input device 500 is flat or raised. If the processor 525 determines that the multi-mode input device 500 is flat, such as from the multi-mode input device 500 resting on the tactile surface, the processor 525 enables a 2D operating mode in block 1310. In the 2D operating mode, the processor 525 enables a mouse input and disables a controller input. If the processor 525 determines that the multi-mode input device 500 is raised, such the multi-mode input device 500 is lifted away from the tactile surface, the processor 525 enables a 3D operating mode in block 1315. In the 3D operating mode, the processor 525 enables a 3D controller input and disables a 2D mouse input.

Figure 14:
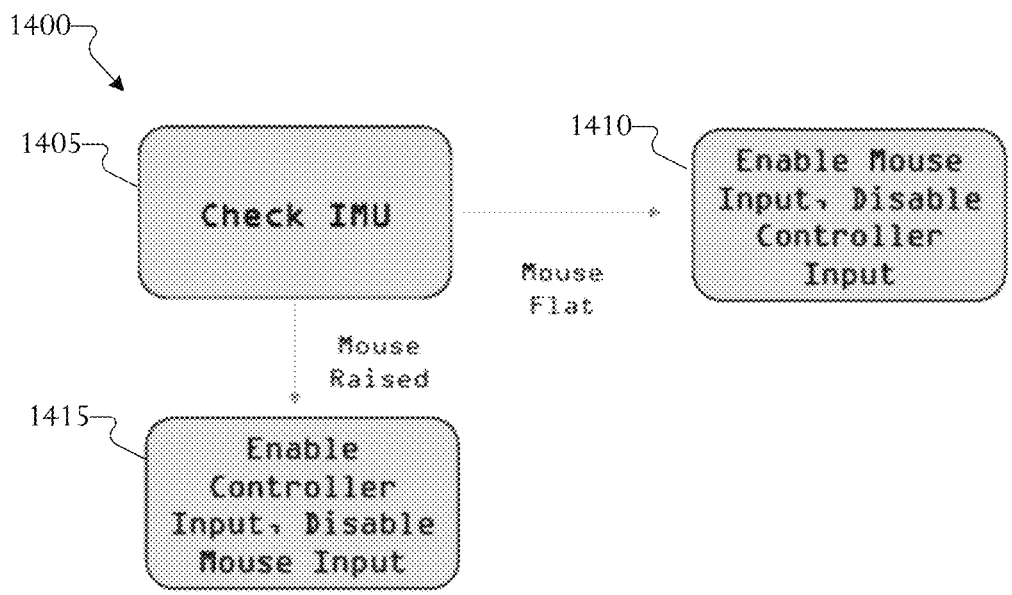
FIG. 14 illustrates a process for using an inertial measurement unit data to automatically transition between modes and track position according to embodiments of the present disclosure.

FIG. 14 illustrates a process for using an inertial measurement unit (IMU) data to automatically transition between modes and track position according to embodiments of the present disclosure. The embodiment of the transition 1400 shown in FIG. 14 is for illustration only and other embodiments could be used without departing from the scope of the present disclosure. Although the example disclosed in FIG. 14 references multi-mode input device 500, embodiments with any of the multi-mode input devices 600, 700, or 800, apply equally.

In block 1405, the processor 525 checks one or sensors 545, such as an IMU, of the multi-mode input device 500. The processor 525 reads, without an input or command received from the user, one or more measurements from the IMU. For example, the processor 525 may receive a measurement signal from the IMU indicating that the multi-mode input device 500 is flat or raised. If the processor 525 determines that the multi-mode input device 500 is flat, such as from the multi-mode input device 500 resting on the tactile surface, the processor 525 enables a 2D operating mode in block 1410. In the 2D operating mode, the processor 525 enables a mouse input and disables a controller input. If the processor 525 determines that the multi-mode input device 500 is raised, such the multi-mode input device 500 is lifted away from the tactile surface, the processor 525 enables a 3D operating mode in block 1415. In the 3D operating mode, the processor 525 enables a 3D controller input and disables a 2D mouse input.

Figure 15:
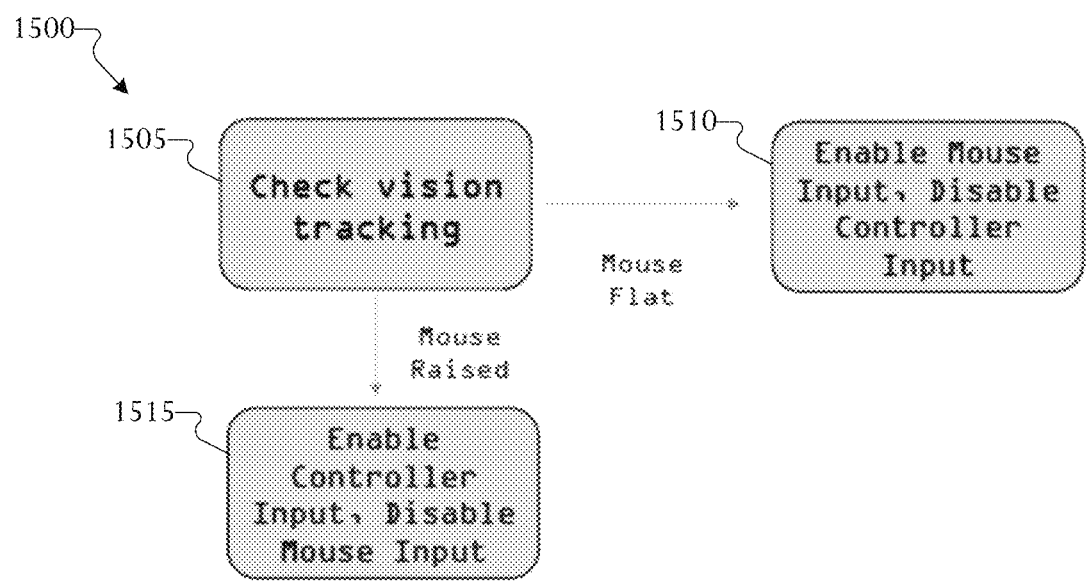
FIG. 15 illustrates a process for using machine/computer vision data to automatically transition between modes and track position according to embodiments of the present disclosure.

FIG. 15 illustrates a process for using machine/computer vision data to automatically transition between modes and track position according to embodiments of the present disclosure. The embodiment of the transition 1500 shown in FIG. 15 is for illustration only and other embodiments could be used without departing from the scope of the present disclosure. Although the example disclosed in FIG. 15 references multi-mode input device 500, embodiments with any of the multi-mode input devices 600, 700, or 800, apply equally.

In block 1505, the processor 525 checks one or sensors 545, such as machine/computer vision sensors, of the multi-mode input device 500. The machine/computer vision may include one or more of visible light sensors, IR sensors, visible light detectors, or IR detectors. The processor 525 reads, without an input or command received from the user, one or more measurements from the machine/computer vision sensors. For example, the processor 525 may receive a measurement signal from the machine/computer vision sensors indicating that the multi-mode input device 500 is flat or raised. If the processor 525 determines that the multi-mode input device 500 is flat, such as from the multi-mode input device 500 resting on the tactile surface, the processor 525 enables a 2D operating mode in block 1510. In the 2D operating mode, the processor 525 enables a mouse input and disables a controller input. If the processor 525 determines that the multi-mode input device 500 is raised, such the multi-mode input device 500 is lifted away from the tactile surface, the processor 525 enables a 3D operating mode in block 1515. For example, the processor 525 can determine, based on measurements from the machine/computer vision sensors, that the multi-mode input device 500 has been raised to a certain elevation or distance from the tactile surface. In the 3D operating mode, the processor 525 enables a 3D controller input and disables a 2D mouse input.

Figure 16:
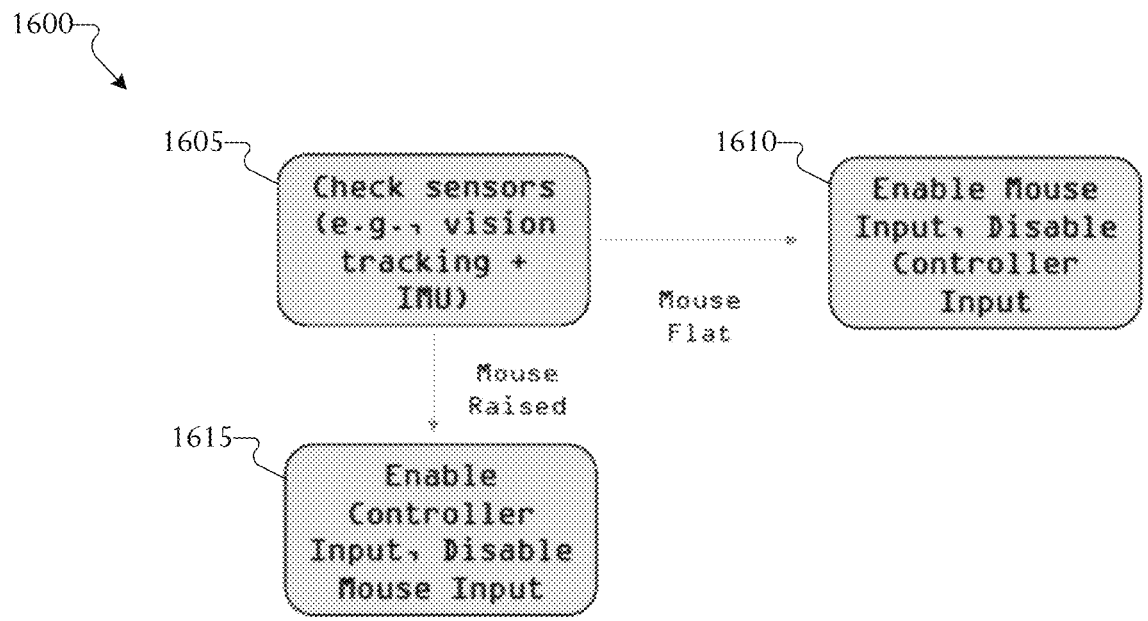
FIG. 16 illustrates a process for using data from a combination of sensors to automatically transition between modes and track position according to embodiments of the present disclosure.

FIG. 16 illustrates a process for using data from a combination of sensors to automatically transition between modes and track position according to embodiments of the present disclosure. The embodiment of the transition 1600 shown in FIG. 16 is for illustration only and other embodiments could be used without departing from the scope of the present disclosure. Although the example disclosed in FIG. 16 references multi-mode input device 500, embodiments with any of the multi-mode input devices 600, 700, or 800, apply equally.

In block 1605, the processor 525 checks a combination of sensors 545, such as machine/computer vision sensors, accelerometers, IMU, gyroscopes, magnetometers, of the multi-mode input device 500. The processor 525 reads, without an input or command received from the user, one or more measurements from the combination of sensors 545. For example, the processor 525 may receive a measurement signal from the combination of sensors 545 indicating that the multi-mode input device 500 is flat or raised. If the processor 525 determines that the multi-mode input device 500 is flat, such as from the multi-mode input device 500 resting on the tactile surface, the processor 525 enables a 2D operating mode in block 1610. In the 2D operating mode, the processor 525 enables a mouse input and disables a controller input. If the processor 525 determines that the multi-mode input device 500 is raised, such the multi-mode input device 500 is lifted away from the tactile surface, the processor 525 enables a 3D operating mode in block 1615. In the 3D operating mode, the processor 525 enables a 3D controller input and disables a 2D mouse input.

Figure 17:
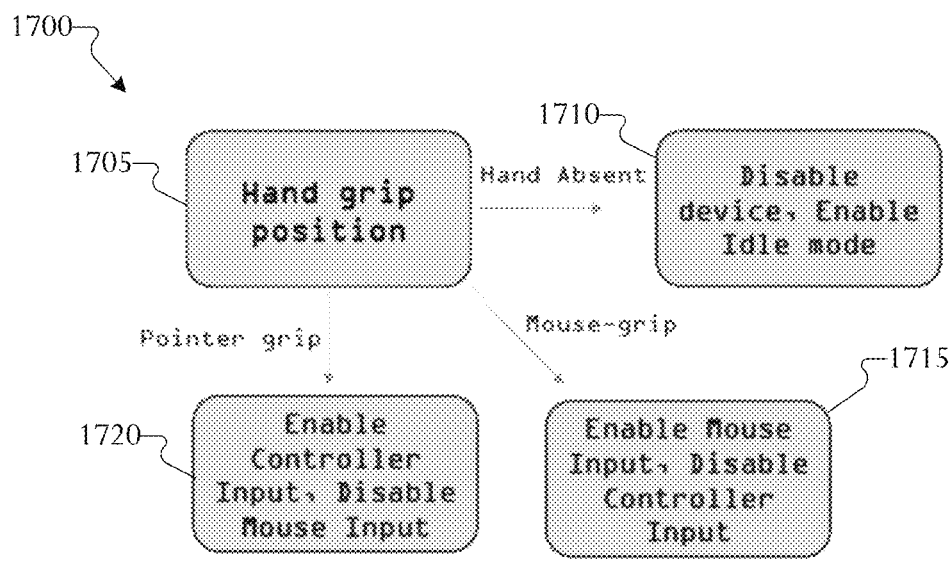
FIG. 17 illustrates a process for user hand position detection to automatically transition between modes according to embodiments of the present disclosure.

FIG. 17 illustrates a process for user hand position detection to automatically transition between modes according to embodiments of the present disclosure. The embodiment of the transition 1700 shown in FIG. 17 is for illustration only and other embodiments could be used without departing from the scope of the present disclosure. Although the example disclosed in FIG. 17 references multi-mode input device 500, embodiments with any of the multi-mode input devices 600, 700, or 800, apply equally.

In block 1705, the processor 525 checks sensors 545, such a physical contact sensor or switch, of the multi-mode input device 500. The processor 525 reads, without an input or command received from the user, one or more measurements from the sensors 545. For example, the processor 525 may receive a measurement signal from the sensors 545 indicating that a hand of the user is one of: absent, holding the multi-mode input device 500 in a mouse-grip (i.e., hand resting upon a top surface of the multi-mode input device 500, or gripping the multi-mode input device 500 in a pointer grip (i.e., hand gripping the multi-mode input device 500 such that one or more fingers are enveloped around a portion of the multi-mode input device 500). If the processor 525 determines that the hand is absent from the multi-mode input device 500, the processor 525 disables the multi-mode input device 500 and enables an idle mode in block 1710. If the processor 525 determines that the hand is holding the multi-mode input device 500 in a mouse-grip, such as when the multi-mode input device 500 resting on the tactile surface and the hand is atop the multi-mode input device 500, the processor 525 enables a 2D operating mode in block 1715. In the 2D operating mode, the processor 525 enables a mouse input and disables a controller input. If the processor 525 determines the hand is gripping the multi-mode input device 500 in a pointer grip, such as when the multi-mode input device 500 is lifted away from the tactile surface and held within a hand of the user, the processor 525 enables a 3D operating mode in block 1720. In the 3D operating mode, the processor 525 enables a 3D controller input and disables a 2D mouse input.

Accordingly, embodiments of the present disclosure provide for several mode switching mechanisms. The multi-mode input device can switch based on one or more of: position, gestures, hand activity, software context, or physical input. Position switching includes detection and action in response to one or more of: elevation, orientation, and movement into specific areas. Gesture switching includes acceleration patterns, motion patterns, and the like. Hand activity switching includes pointer gripping, mouse-type holding, or absence. Software context includes application specific switching, on-button responses, and the like. Physical input switching includes button pressing and depressing, switch engagement, tapping, and the like.

Embodiments of the present disclosure provide a system having an electronic device and a multi-mode input device 500. The system is configured to provide virtual representations, such as mouse position and orientation, cursor or icon contextual shapes, and hand position representations. The mouse position and orientation enables or assists a user to find the multi-mode input device 500 and enhances intuition and use. The hand representations include indications regarding which buttons respective fingers of the user are on or near or representations of a hand indicating how the device is held within the hand. The multi-mode input device 500 includes a mouse and icon that provide for personal customization, contextual shapes (such as being more arrow shaped when in a "pointer" mode) and color highlights indicating actionable areas, such as active buttons or an active trackpad.

Embodiments of the present disclosure enable easy switching between distinct 2D and 3D modes. For example, using the same hybrid input device (multi-mode input device), a user can launch a game using a 2D menu and commence playing the game with a 3D controller. Embodiments of the present disclosure also enable continuous operations flow between 2D and 3D environments. For example, using the same hybrid input device (multi-mode input device) a user can browse a traditional 2D website, and, using the multi-mode input device as a 2D computer mouse, pull a 2D image from the page, and then place the 2D image in a 3D environment using the multi-mode input device as a 3D controller. In the aforementioned example, the user is not required to release the image to change input devices; but instead can maintain active control of the image by merely switching the multi-mode input device from a 2D mode to a 3D mode, such as by lifting the multi-mode input device away from the desk surface.

Although various features have been disclosed in particular embodiments, aspects of each embodiment are not exclusive to the disclosed embodiment and may be combined without other embodiments without departing from the scope of the present disclosure. That is, one or more features disclosed in first embodiment may be combined with one or features from a second or third embodiment without departing from the scope of the present disclosure.

Although various features have been shown in the figures and described above, various changes may be made to the figures. For example, the size, shape, arrangement, and layout of components shown in FIGS. 1 through 17 are for illustration only. Each component could have any suitable size, shape, and dimensions, and multiple components could have any suitable arrangement and layout. Also, various components in FIGS. 1 through 8 could be combined, further subdivided, or omitted and additional components could be added according to particular needs. Further, each component in a device or system could be implemented using any suitable structure(s) for performing the described function(s). In addition, while FIGS. 12-17 illustrates various series of steps, various steps in FIGS. 12-17 could overlap, occur in parallel, occur multiple times, or occur in a different order.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. An input device comprising:
a position sensor; and
a processor configured to:
  determine whether the input device is in a vertical orientation or a horizontal orientation, wherein in the vertical orientation, a first lateral surface is disposed vertically with respect to a ground, and wherein in the horizontal orientation, the first lateral surface is disposed horizontally with respect to the ground,
  switch between operation modes as a function of orientation measurements detected by the position sensor;
  enter a three-dimensional (3D) input mode when the processor detects that the input device is in a first orientation, and
  enter a two-dimensional (2D) input mode when the processor detects that the input device is in a second orientation,
wherein the 2D input mode is configured to provide 2D position data to a connected computer system, and wherein the 3D input mode is configured to provide 3D position data to the connected computer system.

2. The input device of claim 1,
wherein the first orientation comprises a position in which the input device is disposed vertically above a tactile plane, and
wherein the second orientation comprises a position in which the input device is disposed in physical contact with the tactile plane.

3. The input device of claim 1, further comprising:
a first surface; and
a second surface comprising one or more contours,
wherein the first orientation comprises the first surface disposed in a non-horizontal position and the second orientation comprises the first surface disposed in a horizontal position.

4. The input device of claim 3, wherein the one or more contours comprise at least one of:
a curved surface, a recess,
a via, or
an arced opening.

5. The input device of claim 1, wherein the position sensor comprises a grip position sensor, wherein the processor is further configured to detect operation in one of the first orientation or second orientation as a function of a grip position, wherein
when the processor detects that the input device is in a first grip position, the processor determines that the input device is in the first orientation, and
when the processor detects that the input device is in a second grip position, the processor determines that the input device is in the second orientation.

6. The input device of claim 1, wherein the position sensor includes a 2D position sensor, the 2D position sensor comprising a light source and an optical position sensor configured to measure movement of the input device relative to a tactile plane.

7. The input device of claim 1, wherein the position sensor includes a 3D position sensor.

8. The input device of claim 7, wherein the 3D position sensor comprises one of:
one or more electromagnetic coils configured to measure movement of the input device relative to a magnetic field; or
an inertial measurement circuit configured to measure displacement or rotation of the input device relative to an initial position vector, the inertial measurement circuit comprising at least one of:
one or more accelerometers, or
one or more gyroscopes.

9. The input device of claim 7, wherein the 3D position sensor comprises a plurality of video cameras configured to measure a position of the input device relative to an initial position.

10. The input device of claim 1, wherein the position sensor comprises at least one of:
a first 3D position sensor including 2D position-sensing capabilities; or
a combined position sensor comprising a second 3D position sensor and a 2D position sensor.

11. A method comprising:
performing, by a position sensor, orientation measurements; and
switching between operation modes as a function of orientation measurements detected by the position sensor by:
entering a 3D input mode when an input device is in a first orientation, and
entering a 2D input mode when the input device is in a second orientation,
wherein the 2D input mode is configured to provide 2D position data to a connected computer system, and
wherein the 3D input mode is configured to provide 3D position data to the connected computer system.

12. The method of claim 11,
wherein the first orientation comprises a position in which the input device is disposed vertically above a tactile plane, and
wherein the second orientation comprises a position in which the input device is disposed in physical contact with the tactile plane.

13. The method of claim 11, wherein the input device comprises:
a first surface; and
a second surface comprising one or more contours, and
wherein the first orientation comprises the first surface disposed in a non-horizontal position and the second orientation comprises the first surface disposed in a horizontal position.

14. The method of claim 13, wherein the one or more contours comprise at least one of:
a curved surface,
a recess,
a via, or
an arced opening.

15. The method of claim 11, further comprising detecting, via a grip position sensor, an operation in one of the first orientation or second orientation as a function of a grip position, wherein detecting the operation comprises:
in response to detecting that the input device is in a first grip position, determining that the input device is in the first orientation, and
in response to detecting that the input device is in a second grip position, determining that the input device is in the second orientation.

16. The method of claim 11, further comprising: receiving data from a 2D position sensor, the 2D position sensor comprising a light source and an optical position sensor configured to measure movement of the input device relative to a tactile plane.

17. The method of claim 11, further comprising: receiving data from a 3D position sensor, the 3D position sensor comprising one or more electromagnetic coils configured to measure movement of the input device relative to a magnetic field.

18. The method of claim 11, further comprising: receiving data from a 3D position sensor, the 3D position sensor comprising an inertial measurement circuit configured to measure displacement or rotation of the input device relative to an initial position vector, the inertial measurement circuit comprising at least one of:
one or more accelerometers, or
one or more gyroscopes.

19. The method of claim 11, further comprising: receiving data from a 3D position sensor, the 3D position sensor comprising a plurality of video cameras configured to measure a position of the input device relative to an initial position.

20. The method of claim 11, further comprising: receiving data from at least one of:
a first 3D position sensor configured to detect 2D position information and detect 3D position information; or
a combined position sensor, the combined positioned sensor comprising a second 3D position sensor and a 2D position sensor.

* * * * *